United States Patent
Sun et al.

(10) Patent No.: US 10,587,435 B2
(45) Date of Patent: Mar. 10, 2020

(54) TECHNIQUE FOR RADIO CHANNEL ESTIMATION

(71) Applicant: Telefonaktiebolaget LM Ericsson (publ), Stockholm (SE)

(72) Inventors: Wanlu Sun, Solna (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 15/764,623

(22) PCT Filed: Jan. 25, 2018

(86) PCT No.: PCT/EP2018/051842
§ 371 (c)(1),
(2) Date: Mar. 29, 2018

(87) PCT Pub. No.: WO2019/145034
PCT Pub. Date: Aug. 1, 2019

(65) Prior Publication Data
US 2019/0229952 A1    Jul. 25, 2019

(51) Int. Cl.
*H04L 25/02* (2006.01)
*H04W 72/04* (2009.01)
(Continued)

(52) U.S. Cl.
CPC ....... *H04L 25/0224* (2013.01); *H04B 7/0413* (2013.01); *H04B 7/0868* (2013.01);
(Continued)

(58) Field of Classification Search
CPC ..................... H04W 72/0446; H04W 72/08; H04B 7/0413; H04B 7/0868; H04B 7/0617;
(Continued)

(56) References Cited

U.S. PATENT DOCUMENTS

| | | | | |
|---|---|---|---|---|
| 2012/0230380 A1* | 9/2012 | Keusgen | ............. | H04B 7/0695 375/227 |
| 2013/0044650 A1* | 2/2013 | Barker | ................ | H04B 7/0617 370/278 |

(Continued)

FOREIGN PATENT DOCUMENTS

WO    2017190811 A1    11/2017
WO    WO 2017214989 A1 *    12/2017

OTHER PUBLICATIONS

Author Unknown, "Technical Specification Group Radio Access Network; Study on New Radio Access Technology Physical Layer Aspects (Release 14)," Technical Report 38.802, Version 14.1.0, 3GPP Organizational Partners, Jun. 2017, 143 pages.

(Continued)

*Primary Examiner* — Afsar M Qureshi
(74) *Attorney, Agent, or Firm* — Withrow & Terranova, PLLC

(57) ABSTRACT

A technique for determining channel coefficients for a first array of antennas coupled through respective first phase shifters to a first radio chain and a second array of antennas coupled through respective second phase shifters to a second radio chain is described. As to a method aspect of the technique, pairs of first and second phase vectors are applied to the first and second phase shifters, respectively. Each of the pairs defines complementary directional gains at the first and second arrays for receiving reference signals. A channel estimation is performed in each of the first and second radio chains for each of the pairs based on the received reference signals. Based on the channel estimations for each of the pairs, at least one channel coefficient for the antennas in each of the first and second arrays is determined.

25 Claims, 14 Drawing Sheets

(51) Int. Cl.
  *H04B 7/0413* (2017.01)
  *H04B 7/08* (2006.01)
  *H04B 7/06* (2006.01)

(52) U.S. Cl.
  CPC ..... *H04L 25/0244* (2013.01); *H04W 72/0446* (2013.01); *H04B 7/063* (2013.01); *H04B 7/0617* (2013.01)

(58) Field of Classification Search
  CPC .... H04B 7/063; H04B 7/0626; H04B 7/0478; H04L 25/0224; H04L 25/0244; H04L 5/0035; H04L 5/0048; H04L 25/0204
  See application file for complete search history.

(56) References Cited

U.S. PATENT DOCUMENTS

2017/0373743 A1* 12/2017 Park ............... H04B 7/0626
2018/0205577 A1*  7/2018 Shin ............... H04B 17/24
2018/0324760 A1* 11/2018 Yuk ............... H04L 5/0048

OTHER PUBLICATIONS

Author Unknown, "Technical Specification Group Services and System Aspects; Proximity-based services (ProSe); Stage 2 (Release 15)," Technical Specification 23.303, Version 15.0.0, 3GPP Organizational Partners, Jun. 2017, 130 pages.

Author Unknown, "Technical Specification Group Core Network and Terminals; Proximity-services (ProSe) User Equipment (UE) to ProSe function protocol aspects; Stage 3 (Release 15)," Technical Specification 24.334, Version 15.1.0, 3GPP Organizational Partners, Dec. 2017, 263 pages.

Author Unknown, "Technical Specification Group Radio Access Network; Evolved Universal Terrestrial Radio Access (E-UTRA); Physical layer procedures (Release 14)," Technical Specification 36.213, Version 14.3.0, 3GPP Organizational Partners, Jun. 2017, 460 pages.

Author Unknown, "LTE; Evolved Universal Terrestrial Radio Access (E-UTRA); Physical layer procedures (3GPP TS 36.213 version 14.3.0 Release 14)," ETSI Technical Specification 136 213, Version 14.3.0, ETSI, Aug. 2017, 462 pages.

Author Unknown, "Complementary sequences," Wikipedia, the free encyclopedia, last modified Sep. 1, 2017, retrieved Jan. 29, 2018 from https://en.wikipedia.org/w/index.php? title=Complementary_sequences&oldid=798316572, 4 pages.

Alkhateeb, Ahmed et al., "Channel Estimation and Hybrid Precoding for Millimeter Wave Cellular Systems," IEEE Journal of Selected Topics in Signal Processing, vol. 8, No. 5, Oct. 2014, pp. 831-846.

Ericsson, "R1-1612929: Antenna pattern at UE/RSU in NR eV2X," Third Generation Partnership Project (3GPP), TSG RAN WG1 Meeting #87, Nov. 14-18, 2016, 3 pages, Reno, Nevada, USA.

Kalashnikov, Elana, "An Introduction to Golay Complementary Sequences," Eureka, vol. 4, Issue 1, 2014, pp. 40-48.

LG Electronics, "R1-166915: High level view on the study for eV2X," Third Generation Partnership Project (3GPP), TSG RAN WG1 Meeting #86, Aug. 22-26, 2016, 6 pages, Gothenburg, Sweden.

Samsung, "R1-1703021: Discussion on vehicular communications for NR," Third Generation Partnership Project (3GPP), TSG RAN WG1 #88, Feb. 13-17, 2017, 4 pages, Athens, Greece.

Sun, Si-Yue et al., "A Survey on Complementary-Coded MIMO CDMA Wireless Communications," IEEE Communication Surveys & Tutorials, vol. 17, No. 1, First Quarter 2015, pp. 52-69.

International Search Report and Written Opinion for International Patent Application No. PCT/EP2018/051842, dated Oct. 23, 2018, 11 pages.

* cited by examiner

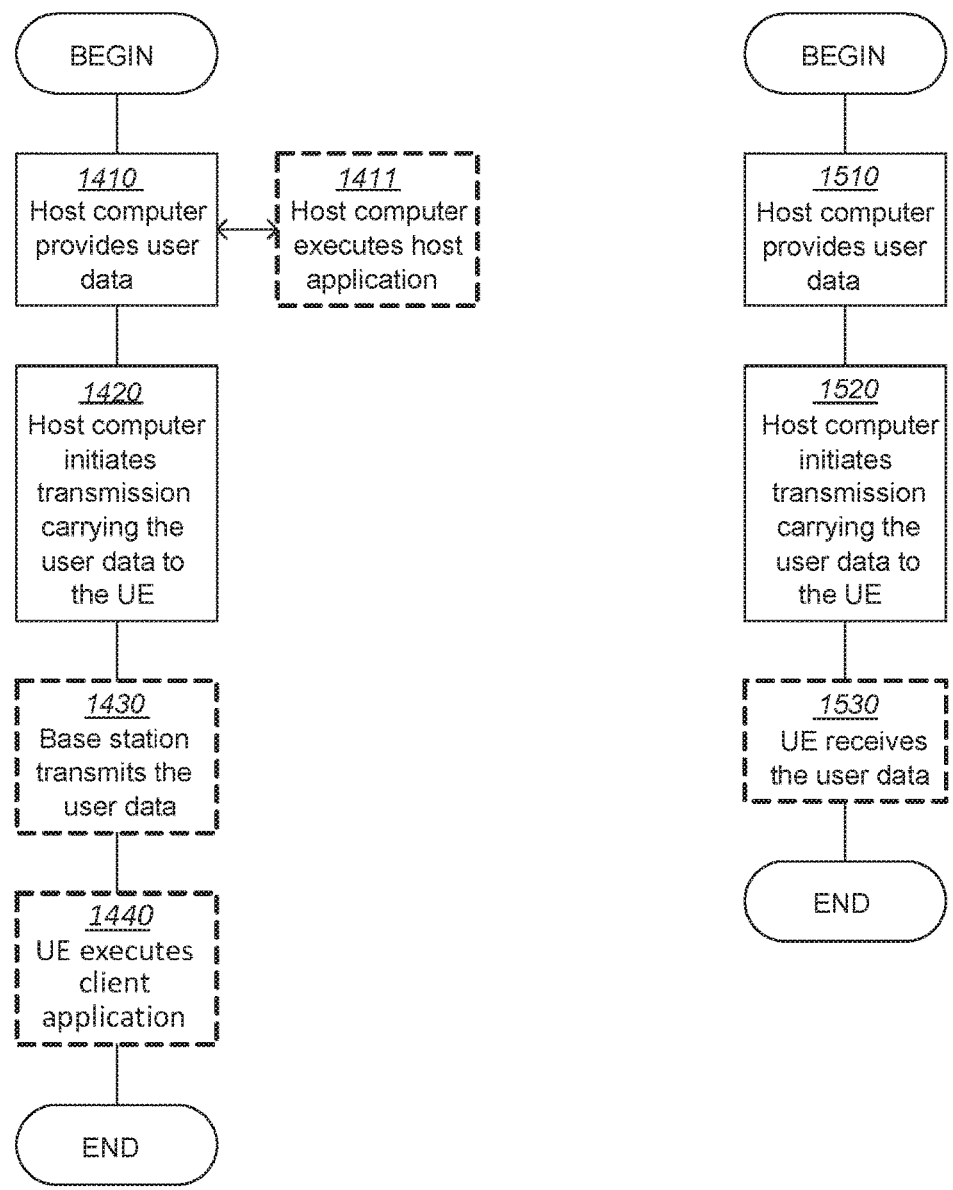

TECHNIQUE FOR RADIO CHANNEL ESTIMATION

This application is a 35 U.S.C. § 371 national phase filing of International Application No. PCT/EP2018/051842, filed Jan. 25, 2018, the disclosure of which is incorporated herein by reference in its entirety.

TECHNICAL FIELD

The present disclosure generally relates to a technique for channel estimation. More specifically, a method and a device are provided for determining channel coefficients for an analog domain of a radio device.

BACKGROUND

Radio communications involving at least one vehicle, also referred to as vehicle-to-everything (V2X) communications, carry both non-safety and safety information. Hence, applications and services using the V2X communications are associated with a specific set of requirements, e.g., in terms of latency, reliability, capacity, etc. for transmitting messages known as Common Awareness Messages (CAM) and Decentralized Notification Messages (DENM) or Basic Safety Message (BSM). The data volume of these messages is very low compared to mobile broadband (MBB) communications. Rather, safety-related V2X communications usually require high reliability, low latency and instant communication.

At least in certain situations, these requirements can be fulfilled only if the transmission is self-contained, that is by including control information and data in one transmission time interval (TTI). By blindly decoding the control information scrambled with an identifier, the identified radio device can receive the control information, e.g., a scheduling assignment, for instant data reception.

Moreover, to realize sufficient link margin or allow frequency reuse, transmitter and/or receiver use large antenna arrays for directional beamforming. However, each antenna port of the antenna arrays at transmitter and receiver has to be coupled to a radio chain for precoding and channel estimation, respectively, in the digital domain. To reduce the costs and power consumption of such radio chains, precoding and channel estimation can be divided between the analog domain and the digital domain. A. Alkhateeb et al. describe in the document "Channel Estimation and Hybrid Precoding for Millimeter Wave Cellular Systems", IEEE J. Sel. Topics Signal Process., vol. 8, no. 5, October 2014, pp. 831-46, such a radio device including both an analog radio frequency beamformer and a digital baseband beamformer.

However, at the time of a self-contained transmission, the radio device supposed to receive the self-contained transmission has no knowledge as to the state of the radio channel between transmitter and receiver. Hence, the radio frequency beamformer at the receiver has to sweep its directional gain until reference signals are received from the transmitter for channel estimation and subsequent reception of the control information and the data. Such an unpredictable delay is unacceptable for many radio applications, particularly in V2X communications.

SUMMARY

Accordingly, there is a need for a radio communication technique that improves latency, reliability and/or hardware complexity in multi-antenna systems.

As to a method aspect, a method of determining channel coefficients for a first array of antennas coupled through respective first phase shifters to a first radio chain and a second array of antennas coupled through respective second phase shifters to a second radio chain is provided. The method may comprise a step of applying pairs of first and second phase vectors to the first and second phase shifters, respectively. Each of the pairs may define complementary directional gains at the first and second arrays for receiving reference signals. The method may further comprise a step of performing or initiating a channel estimation in each of the first and second radio chains for each of the pairs based on the received reference signals. The method may further comprise a step of determining, based on the channel estimations for each of the pairs, at least one channel coefficient for the antennas in each of the first and second arrays.

By estimating the channel in the radio chains based on complementary directional gains, at least some embodiments can determine the channel coefficients for the antennas without the need of implementing a radio chain configured for channel estimation for each of the antennas. Same or further embodiments can, based on the complementary directional gains, receive the reference signals, and optionally control information and/or data, e.g., in a self-contained transmission, reliably and/or without a priori knowledge as to the phases or a direction of origin for the reference signals and/or the control information. Time-consuming beam sweeping can be avoided. The reference signals, and optionally the control information, can be received at the first attempt.

At least some embodiments of the technique may allow instant reception of self-contained transmissions. Same or further embodiments may provide a channel estimation technique that allows reducing the number of radio chains without reducing the number of antennas and delaying their channel estimations.

The reception (e.g., of the reference signals and/or the control information) using the complementary directional gains at the first and second arrays may also be referred to as a widebeam reception. The directional gains may be complementary in that a direction corresponding to a minimum in the directional gain at the first array corresponds to a maximum in the directional gain at the second array.

The channel coefficients determined for the antennas in each of the first and second arrays, i.e. for the first and second arrays of antennas, may relate to a radio channel reaching from a transmitter of the reference signals to the respective antennas. In contrast, the channel estimates in the first and second radio chains may relate to a channel reaching from the transmitter of the reference signals to the respective radio chain (e.g., including the associated phase shifters).

The technique may be implemented as a method of performing channel estimation at receivers in a wireless communication networks. The wireless network may provide V2X and/or D2D communications. Embodiments of the technique may achieve a widebeam reception using a hybrid combining architecture.

The method may be implemented by a radio device comprising the first array of antennas coupled through the respective first phase shifters to the first radio chain and the second array of antennas coupled through the respective second phase shifters to the second radio chain. The number of antennas in each of the first array and the second array may be equal.

The technique may be implemented as a method of performing a channel estimation for a receiver with hybrid combining architecture, wherein the channel to be estimated ranges from a point at which the reference signals are inserted (e.g., at a transmitter) to the (e.g., physical) antennas at the device (e.g., at a receiver). The method may apply the different phase vectors as time-varying phases (e.g., as part of analog combiner weights) within steps of the channel estimation. The time-varying phases may enable both the determination of the channel coefficients for the antennas (e.g., for the analog domain) and a widebeam reception during the channel estimation. The technique may be particularly valuable when being applied to a self-contained transmission, for which a control channel needs to be blindly decoded for receiving control information. The channel estimation may be performed simultaneously with the reception of the control information.

The reference signals may be received from a multi-antenna station. The method may further comprise a step of transmitting a control message to the multi-antenna station. The control message may be indicative of a precoding matrix depending on the determined channel coefficients. For example, the control message may comprise a precoding matrix index (PMI). The multi-antenna station may be another radio device (optionally implementing the technique) or a base station.

Different reference signals transmitted through different antenna ports of the multi-antenna station may be received from the multi-antenna station. The channel from the multi-antenna station to the antennas may be a multiple-input multiple-output (MIMO) channel. The MIMO channel may comprise a directional gain (e.g., for beamforming transmission) at the multi-antenna station, which may be controlled according to the control message, and/or a directional gain (e.g., for beamforming reception) at the radio device performing the method, which may be controlled according to a controlling step.

The at least one channel coefficient determined for the antennas in each of the first and second arrays may correspond to one or more combinations of the channel coefficients of each of the antennas in the corresponding array. The channel coefficients of each of the antennas in the corresponding array may also be referred to as antenna-specific channel coefficients. Any combination of the antenna-specific channel coefficients may be a function (e.g., a linear combination) of the antenna-specific channel coefficients without expressly determining the antenna-specific channel coefficients.

The number of combinations of antenna-specific channel coefficients for each of the first and second arrays may correspond to the number of antennas in the corresponding array or may be one less the number of antennas in the corresponding array. For example, each of the first and second arrays may comprise N antennas, and the at least one channel coefficient determined for the antennas in each of the first and second arrays may be indicative of N–1 relative phases between the N antennas.

An over-all phase may be determined and/or controlled by the respectively coupled radio chain.

Alternatively or in addition, the channel coefficients may be determined for each of the antennas in each of the first and second antenna arrays, or for each but one of the antennas in each of the first and second antenna arrays. For example, the first array may comprise N first antennas labeled 1 to N. The first antenna labeled 1 may be coupled directly or with a fixed phase to the first radio chain, which may determine a complex weight (e.g., a phase and/or a gain) based on its channel estimate. The first antennas labeled 2 to N of the N first antennas may be coupled, one-by-one, through N–1 different first phase shifters to the first radio chain. The N–1 phases of the N–1 phase shifters are controlled based on the determined N–1 channel coefficients. Analogously, the second radio chain may be coupled through N'–1 phase shifters to the second array of N' second antennas, which phases are controlled based on N'–1 determined antenna-specific channel coefficients.

The method may further comprise a step of performing or initiating at least one of a beamforming transmission and a beamforming reception based on the determined channel coefficients. The first and second radio chains may function as receiver chains, e.g., for receiving the reference signals and/or the beamforming reception. Alternatively or in addition, the first and second radio chains may function as transmitter chains, e.g., for the beamforming transmission.

The beamforming reception may also be referred to as multi-antenna reception. The beamforming transmission may also be referred to as multi-antenna transmission. The beamforming transmission may use at least one of the determined channel coefficients and/or controlled directional gains by virtue of channel reciprocity, e.g., in a time-division duplex (TDD) communication.

The method may further comprise a step of controlling the directional gain by controlling phases of the first and second phase shifters based on the determined channel coefficients. For example, by estimating the channel in the radio chains based on complementary directional gains, the radio device can control the phases of the phase shifters without the need of implementing a radio chain configured for channel estimation for each of the antennas. Each channel coefficient determined for the antennas in each of the first and second arrays may be a phase value.

The directional gain of the radio device may be controlled for at least one of data transmission (e.g., based on channel reciprocity) and data reception. The beamforming transmission and/or the beamforming reception may use at least one of the determined channel coefficients and the controlled directional gain.

The reference signals may be received from a station, e.g., another radio device (e.g., for peer-to-peer radio communication or radio communication on a sidelink) or a base station (e.g., in a cellular network for radio communication on a downlink or an uplink). The controlled directional gain may be directed to the station.

The phases may be controlled for those phase shifters coupled with the antennas for which the channel coefficients (e.g., antenna-specific channel coefficients) are determined. In the case of one or more determined combinations that depend on the antenna-specific channel coefficients of a subset of the antennas (in any of the first or second array), the phases of the phase shifters coupled to the corresponding subset of antennas may be controlled based on the one or more combinations.

A complex weight may be applied in each of the first and second radio chains. For example, the baseband signals of the first and second radio chains may be combined after applying the respective complex weight. Alternatively or in addition, each of the first and second radio chains may decode the baseband signal into softbits that are combined (e.g., added) after applying the respective complex weights. For each of the phase shifters, a combination of the phase at the phase shifter and the complex weight applied in the radio chain coupled to the phase shifter (e.g., a sum of the phases)

depends on at least one of the channel coefficients determined for the antennas and the channel estimates in the radio chain.

The complex weight may comprise a phase and a (e.g., positive) gain. The gain of each of the first and second radio chains may be proportional to the sum of the absolute values of the channel coefficients determined for the antennas coupled to the respective radio chain. The absolute value of the determined channel coefficient may correspond to a root mean square of a signal level at the corresponding antenna.

For each of the antennas, the sum of a phase of the phase shifter coupled to the antenna and a phase applied in the radio chain coupled to the phase shifter may match a phase of the channel coefficient determined for the antenna. For example, the phase d of the phase shifter coupled to any one of the antennas and the phase b of the radio chain coupled to said phase shifter may match the phase $\varphi(\hat{H})$ of the channel coefficient $\hat{H}$ determined for said antenna according to $d+b=-\varphi(\hat{H})$.

Baseband signals of the first and second radio chains may be combined for decoding. For example, each of the determined channel coefficients may comprise a phase and a gain. The phase shifters may match the phase of the determined channel coefficients. The first and second radio chains may combine their baseband signals depending on the gains of the determined channel coefficients. The baseband signals may be combined according to maximum-ratio combining (MRC).

The phase shifters may be implemented in an analog domain. Applying the phases may be performed in the analog domain. The radio chains may be implemented in a digital domain or may at least comprise a digital domain. Estimating the channels may be performed in the digital domain.

The phase shifters and the respective radio chain may be coupled through at least one of a respective signal combiner and a respective analog-to-digital converter, e.g., for receiving the reference signals and/or for the beamforming reception. Moreover, each radio chain and the respective phase shifters may be coupled through at least one of a digital-to-analog converter and a signal splitter (also: power splitter), e.g., for the beamforming transmission.

Each of the first and second radio chains may comprise a digital domain. Each of the first and second radio chains may be configured to numerically determine the channel estimates. Each of the first and second radio chains may comprise at least one of an antenna amplifier, a down-converter for reception, an up-converter for transmission, an analog-to-digital converter for reception, a digital-to-analog converter for transmission, a Fourier analyzer for reception (e.g., an OFDM demodulator) and a Fourier synthesizer for transmission (e.g., an OFDM modulator).

The complementary directional gains at the first and second arrays defined by each of the pairs may correspond to a widebeam of the first and second arrays. The widebeam (which may also be referred to as widebeam gain) may be used for the widebeam reception (e.g., reception of the reference signals and/or the control information). In other words, a combined directional gain of the complementary directional gains may correspond to the widebeam. The widebeam may correspond to a directional gain of any single one of the antennas.

Each of the pairs of the first and second phase vectors may include a pair of complementary sequences, e.g., binary or polyphase complementary sequences. Herein, the expression "complementary sequence" may encompass Golay Complementary Pairs (GCPs) and/or epsilon-complementary sequences according to the document WO 2017/190811 A1 (also referred to as ε-complementary weights).

Each pair may comprise a first (e.g., finite) sequence as the first phase vector applied to the first phase shifters and a second (e.g., finite) sequence as the second phase vector applied to the second phase shifters. The first phase vector and the second phase vector may be complementary in that a minimum of the directional gain defined by the first phase vector coincides with a maximum of the directional gain defined by the second phase vector.

The directional gain of a sequence or phase vector $(a_i)_{i=0 \ldots N-1}$ may be represented by a polynomial $A(z)=a_0+a_1 \cdot z+ \ldots +a_{N-1} \cdot z^{N-1}$. The first and second phase vectors may be a complementary pair, i.e., may define complementary directional gains, if (e.g., only if) the absolute squares of the polynomial A of the first phase vector and the polynomial B of the second phase vector are constant, e.g., according to $|A(z)|^2+|B(z)|^2=2 \cdot N$.

In each of the first and second radio chains, the channel estimations for different pairs may be based on different reference signals. For example, the reference signals may be consecutively received with a different pair of phase vectors applied in each case.

Different pairs of first and second phase vectors may be applied in different transmission time intervals, TTI. The TTI may be a subframe or slot of a radio frame structure. The application of different pairs of phase vectors may also be referred to as a rotation of analog combiner weights for channel estimation.

The number of different pairs applied (e.g., for determining the corresponding number of channel coefficients for the antennas) may correspond to the number of antennas per array and/or the length of each phase vector.

For each of the first and second antenna arrays, the respective phase vectors applied at the respective antenna array may be linearly independent, e.g., orthogonal. For example, all first phase vectors used for determining the channel coefficients for the antennas may be linearly independent, e.g., orthogonal. All second phase vectors used for determining the channel coefficients for the antennas may be linearly independent, e.g., orthogonal.

The complementarity of each of the pairs of first and second phase vectors may be a requirement for each of the pairs of first and second phase vectors. The linear independence may be a requirement all first phase vectors. Furthermore, the linear independence may be a requirement all second phase vectors.

For each of the first and second antenna arrays, the step of determining the channel coefficients of the antennas of the respective antenna array may include multiplying an inverse matrix of the respective phase vectors to results of the channel estimates in the respective radio chain.

The method may further comprise a step of receiving or initiating to receive, in a TTI during which at least one of the pairs of first and second phase vectors is applied, one or more of the reference signals, control information and/or data. At least in some embodiments, the application of the first and second phase vectors, which are used for receiving the reference signals and determining the channel coefficients, does not limit the capability of receiving the control information and optionally data (e.g., for a self-contained transmission) due to the complementarity of each of the pairs of first and second phase vectors.

The technique may be implemented at one or more radio devices, and/or at a radio access network (RAN) serving the one or more radio devices. The method may be performed by a radio device, or by a base station or a cell of the RAN. The base station may encompass any station that is configured to provide radio access to the radio device. The base station or cell of the RAN may serve a plurality of radio devices, e.g., each implementing the technique.

The radio device may be configured for peer-to-peer communication (e.g., on a sidelink) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrow-band Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to a device aspect, a device for determining channel coefficients for a first array of antennas coupled through respective first phase shifters to a first radio chain and a second array of antennas coupled through respective second phase shifters to a second radio chain is provided. The device may be configured to perform the method aspect. Alternatively or in addition, the device may comprise an applying unit configured to apply pairs of first and second phase vectors to the first and second phase shifters, respectively, each of the pairs defining complementary directional gains at the first and second arrays for receiving reference signals. The device may further comprise an estimating unit configured to perform or initiate a channel estimation in each of the first and second radio chains for each of the pairs based on the received reference signals. The device may further comprise a determining unit configured to determine, based on the channel estimations for each of the pairs, at least one channel coefficient for the antennas in each of the first and second arrays.

As to a further device aspect, a device for determining channel coefficients for a first array of antennas coupled through respective first phase shifters to a first radio chain and a second array of antennas coupled through respective second phase shifters to a second radio chain is provided. The device comprises at least one processor and a memory. Said memory may comprise instructions executable by said at least one processor whereby the device is operative to apply pairs of first and second phase vectors to the first and second phase shifters, respectively, each of the pairs defining complementary directional gains at the first and second arrays for receiving reference signals. Execution of the instructions may further cause the device to be operative to perform or initiate a channel estimation in each of the first and second radio chains for each of the pairs based on the received reference signals. Execution of the instructions may further cause the device to be operative to determine, based on the channel estimations for each of the pairs, at least one channel coefficient for the antennas in each of the first and second arrays.

As to a still further device aspect, a device for determining channel coefficients for a first array of antennas coupled through respective first phase shifters to a first radio chain and a second array of antennas coupled through respective second phase shifters to a second radio chain is provided. The device may comprise one or more modules for performing the method aspect. Alternatively or in addition, the device may comprise a phase application module for applying pairs of first and second phase vectors to the first and second phase shifters, respectively, each of the pairs defining complementary directional gains at the first and second arrays for receiving reference signals. Alternatively or in addition, the device may comprise a channel estimation module for performing or initiating a channel estimation in each of the first and second radio chains for each of the pairs based on the received reference signals. Alternatively or in addition, the device may comprise a determination module for determining, based on the channel estimations for each of the pairs, at least one channel coefficient for the antennas in each of the first and second arrays.

As to a still further aspect, a user equipment (UE) configured to communicate with a base station is provided. The UE comprises a radio interface and processing circuitry configured to execute the any one of the steps of the method aspect.

As to a still further aspect a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry, the processing circuitry of the UE being configured to execute any one of the steps of the method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect a method implemented in a user equipment (UE) is provided. The method may comprise any of the steps of the method aspect.

The device, the UE, the system or any node or station for embodying the technique may further include any feature disclosed in the context of the method aspect, and vice versa. Particularly, any one of the units and modules, or a dedicated unit or module, may be configured to perform or trigger one or more of the steps of any one of the method aspect.

BRIEF DESCRIPTION OF THE DRAWINGS

Further details of embodiments of the technique are described with reference to the enclosed drawings, wherein:

FIGS. 14 and 15 show flowcharts for methods implemented in a communication system including a host computer, a base station and a user equipment.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
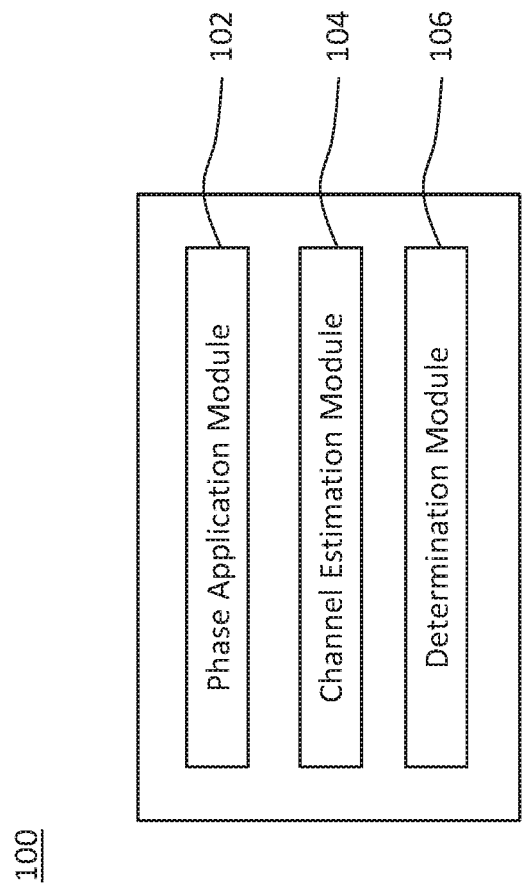
FIG. 1 shows a schematic block diagram of a device for determining channel coefficients for a first array of antennas coupled through respective first phase shifters to a first radio chain and a second array of antennas coupled through respective second phase shifters to a second radio chain.

FIG. 1 schematically illustrates a block diagram of a device for determining channel coefficients for a first array of antennas coupled through respective first phase shifters to a first radio chain and a second array of antennas coupled through respective second phase shifters to a second radio chain. The device is generically referred to by reference sign 100.

The device 100 comprises a phase application module 102 that applies pairs of first and second phase vectors to the first and second phase shifters, respectively, each of the pairs defining complementary directional gains at the first and second arrays for receiving reference signals. The device 100 further comprises a channel estimation module 104 that performs or initiates a channel estimation in each of the first and second radio chains for each of the pairs based on the received reference signals. The device 100 further comprises a determination module 106 that determines, based on the channel estimations for each of the pairs, at least one channel coefficient for the antennas in each of the first and second arrays.

Any of the modules of the device 100 may be implemented by units configured to provide the corresponding functionality.

While the technique is described for first and second arrays of antennas to the benefit of clarity and conciseness, the technique is readily applicable to radio devices comprises more than two arrays, e.g., by applying complementary sets of more than two phase vectors to the respective arrays (e.g., as a generalization of pairs of complementary sequences). Moreover, while the device 100 is described for linear arrays of antennas, the technique is readily applicable to two-dimensional arrays and/or arrays on curved lines or surfaces.

Furthermore, a multi-antenna configuration comprising at least two arrays of antennas coupled through respective phase shifters to respective radio chains does not exclude the presence of further antennas, further arrays of antennas and/or further radio chains, which are not coupled to such phase shifters. Any of the antennas (e.g., each of the antennas of the first and second arrays) may be implemented by one or more antenna elements.

In one aspect, the device 100 may be part of a radio access network (RAN). The device 100 may be embodied by or at a base station of the RAN, nodes connected to the RAN for controlling the base station or a combination thereof. In another aspect, which is combinable with the one aspect, the device 100 may be wirelessly connected or connectable to a RAN. The device 100 may be embodied by or at a radio device configured for accessing the RAN, for example in a vehicle configured for radio-connected driving. In a further aspect, which is combinable with the one and/or the other aspect, the device 100 may be wirelessly connected or connectable to another radio device, for example another vehicle. The device 100 may be embodied by or at a radio device configured for wireless ad hoc connections.

The base station may encompass a network controller (e.g., a Wi-Fi access point) or a radio access node (e.g. a 3G Node B, a 4G eNodeB or a 5G gNodeB) of the RAN. The base station may be configured to provide radio access. Alternatively or in addition, the one or more radio devices may include a mobile or portable station or a radio device connectable to the RAN. Each radio device may be a user equipment (UE), a device for machine-type communication (MTC) and/or a device for (e.g., narrowband) Internet of Things (IoT). Two or more radio devices may be configured to wirelessly connect to each other, e.g., in an ad hoc radio network or via 3GPP sidelinks.

Figure 2:
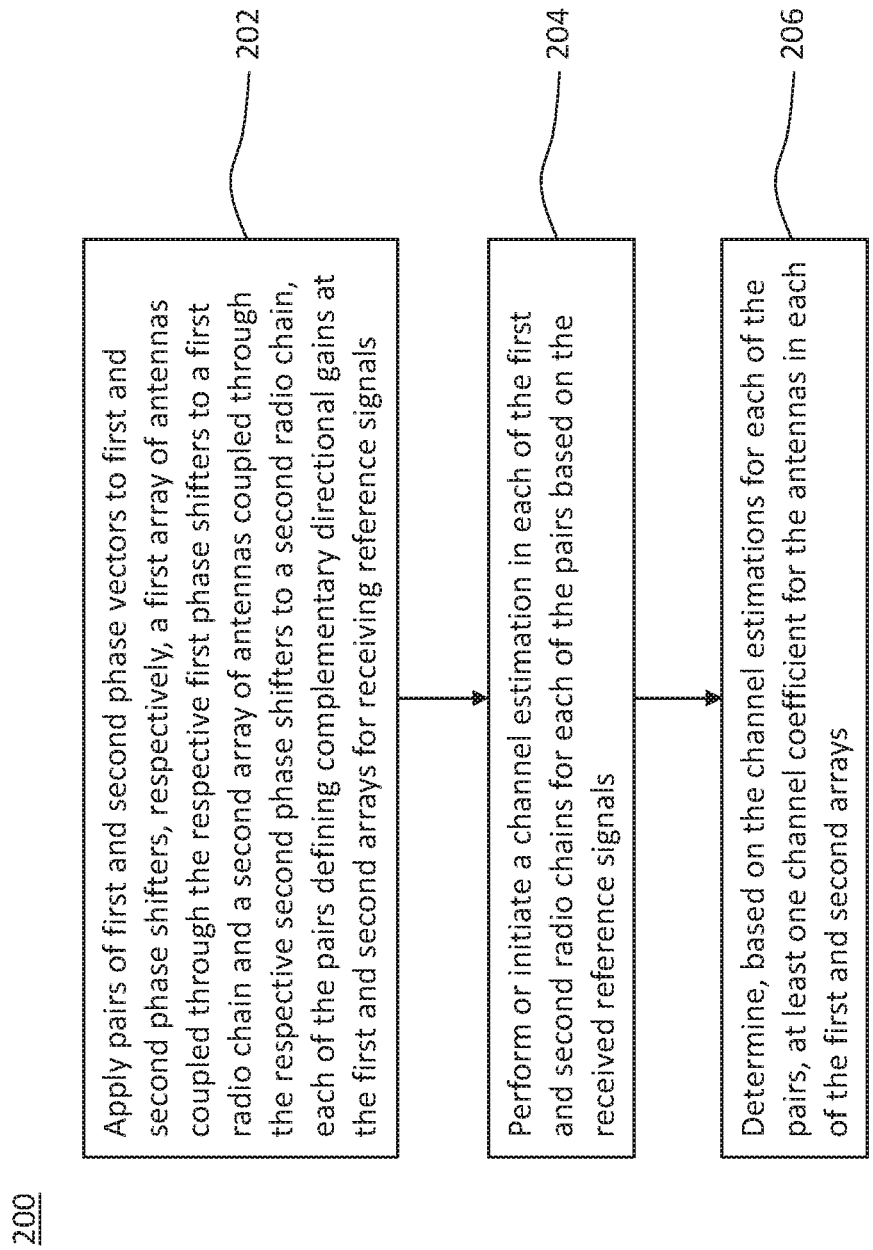
FIG. 2 shows a flowchart for a method of determining channel coefficients for a first array of antennas coupled through respective first phase shifters to a first radio chain and a second array of antennas coupled through respective second phase shifters to a second radio chain, which method is implementable by the device of FIG. 1.

FIG. 2 shows a flowchart for a method 200 of determining channel coefficients for a first array of antennas coupled through respective first phase shifters to a first radio chain and a second array of antennas coupled through respective second phase shifters to a second radio chain. The method 200 comprises a step 202 of applying pairs of first and second phase vectors to the first and second phase shifters, respectively. Each of the pairs defines a pair of complementary directional gains at the first and second arrays for receiving at least reference signals. A channel estimation is performed or initiated in each of the first and second radio chains for each of the pairs based on the received reference signals according to a step 204. The method 200 further comprises a step 206 of determining, based on the channel estimations for each of the pairs, at least one channel coefficient for the antennas in each of the first and second arrays.

The method 200 may be performed by the device 100, e.g., at or using the radio device for accessing the RAN or another radio device. For example, the modules 102, 104 and 106 may perform the steps 202, 204 and 206, respectively.

Embodiments of the device 100 may be configured for stand-alone radio communication, ad hoc radio networks and/or vehicular radio communications (V2X), particularly according to technical standard documents of the Third Generation Partnership Project (3GPP). In Release 12, the 3GPP standard for Long Term Evolution (LTE) had been extended with support of device-to-device (D2D) communications (also referred to as "sidelink" communications). D2D features (also referred to as Proximity Services, ProSe) are targeting both commercial and Public Safety applications. ProSe features enabled since 3GPP LTE Release 12 include device discovery, i.e., one radio device is able to sense the proximity of another radio device and associated application by broadcasting and detecting discovery messages that carry device and application identities. Further ProSe features enable direct communication based on physical channels terminated directly between devices. Such features are defined, inter alia, in the documents 3GPP TS 23.303, Version 15.0.0, and 3GPP TS 24.334, Version 15.1.0.

In 3GPP LTE Release 14, the D2D communications were further extended to support of V2X communications, which include any combination of direct communication between vehicles, pedestrians and infrastructure. While V2X communications may take advantage of a network infrastructure (e.g., a RAN) if available, at least basic V2X connectivity is possible even in case of lacking RAN coverage. Implementing V2X communications based on a 3GPP radio interface (e.g., according to LTE or its successors) can be economically advantageous due to economies of scale. Furthermore, using or extending a 3GPP radio interface may enable a tighter integration between communications with the network infrastructure (V2I communications) and vehicular D2D communications (such as vehicle-to-pedestrian, V2P, and vehicle-to-vehicle, V2V, communications) as compared to using a dedicated V2X technology.

Figure 3:
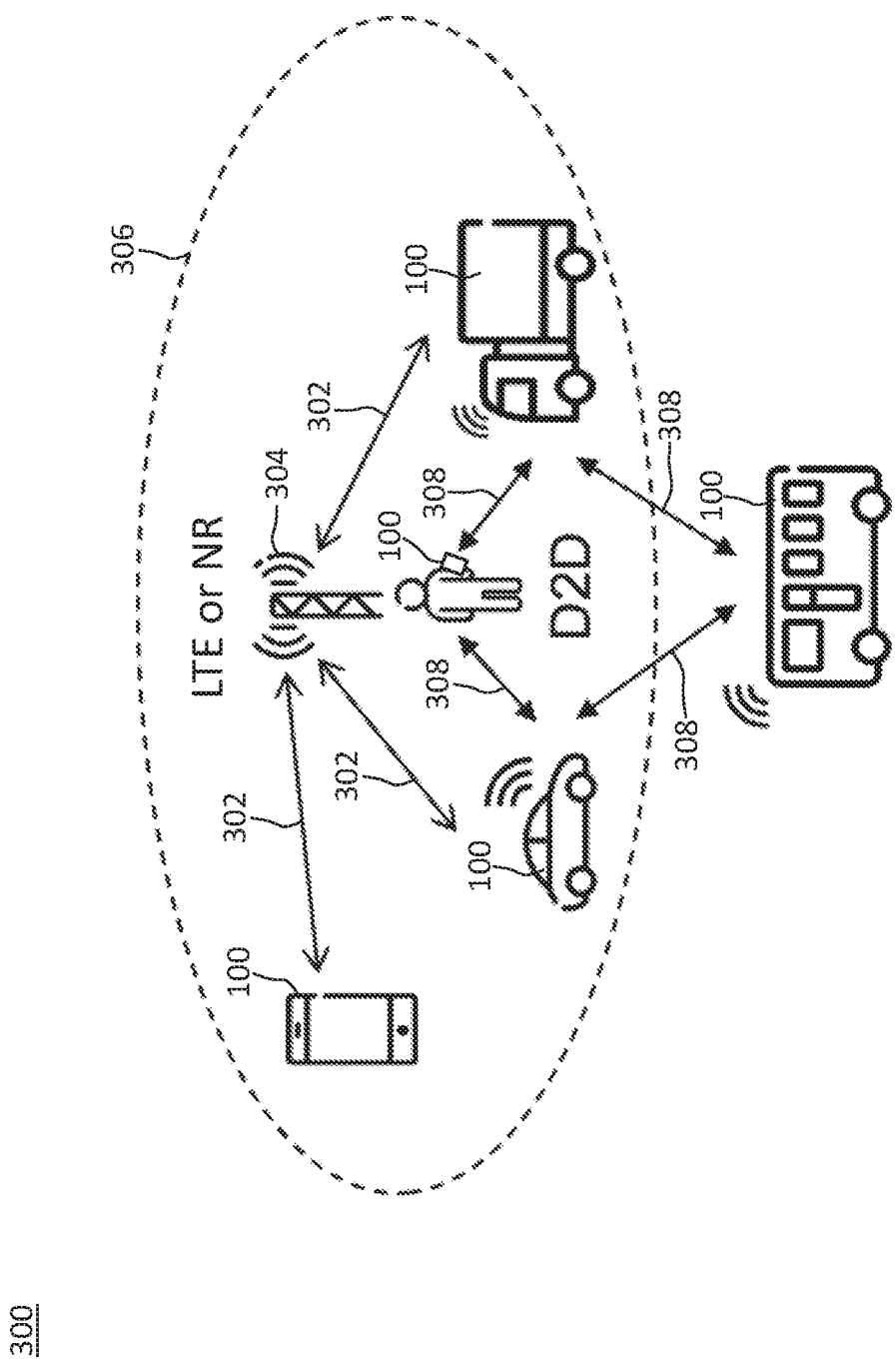
FIG. 3 schematically illustrates an exemplary environment for implementing the device of FIG. 1 and the method of FIG. 2.

FIG. 3 schematically illustrates an exemplary radio environment 300 for implementing the technique. The radio environment 300 includes V2X communications 302 with a network infrastructure including at least one base station 304 providing radio access within a cell 306. The radio environment 300 further includes V2X communications 308 without the need for a network infrastructure.

Any radio communication, e.g., any of the V2X communications 302 or 308, may be associated with specific sets of requirements, e.g., in terms of latency, reliability, capacity and/or Quality of Service. By way of example, the European Telecommunications Standards Institute (ETSI) has defined two types of messages for road safety, including a Co-operative Awareness Message (CAM) and a Decentralized Environmental Notification Message (DENM).

The CAM message enables vehicles, including emergency vehicles, to notify their presence and other relevant parameters in a broadcast fashion. Such messages target other vehicles, pedestrians and infrastructure, and are handled by their applications. CAM message also serves as an active assistance to safety driving for normal traffic. Conventionally, the availability of a CAM message is indicatively checked for every 100 ms, yielding a maximum detection latency requirement of on the order of (e.g., a maximum latency of) 100 ms for most messages.

However, the latency requirement for a warning message triggered by or for pre-crash sensing typically is 50 ms, which can be fulfilled by embodiments of the technique, e.g., by a self-contained transmission. The self-contained transmission may include, e.g., in one or few transmission time intervals (TTIs), a widebeam reception of the reference signals and control information followed by a data transmission and/or reception based on the determined channel coefficients and in accordance with the received control information.

The DENM message is event-triggered, such as by braking. Conventionally, the availability of a DENM message is also checked for every 100 ms, and the requirement of maximum latency is equal to or less than 100 ms. The package size of CAM and DENM messages varies from 100 bytes to 800 bytes or more bytes. A typical size is on the order of 300 bytes.

Such messages are supposed to be detected by all vehicles in proximity, which can be achieved by implementing the technique in vehicles, e.g., for the widebeam reception of at least the reference signals and, optionally control information, used for demodulating and/or scheduling of the message.

Alternatively or in addition, embodiments of the device 100 may be configured for multi-antenna radio communication, using multiple-input multiple-output (MIMO) radio channels and/or performing beamforming or spatial filtering in radio transmissions and/or radio receptions. Particularly, embodiments of the device 100 may use the first and second antenna arrays coupled to phase shifters (also referred to as multi-antenna configuration) for V2X communications.

V2X communications support one transmitting (Tx) antenna and two receiving (Rx) antennas since 3GPP LTE Release 14. Increasing further the number of antennas to enhance reliability and data rate for 3GPP LTE V2X Release 15 and V2X according to 3GPP New Radio (NR or 5G) has been analyzed at 3GPP TSG RAN WG1 Meeting #86, R1-166915 in "High level view on the study for eV2X"; 3GPP TSG RAN WG1 Meeting #87, R1-1612929 in "Antenna pattern at UE/RSU in NR eV2X"; and at 3GPP TSG RAN WG1 Meeting #88, R1-1703021 in "Discussion on vehicular communication for NR". More specifically, NR studies including 3GPP TR 38.802 (V14.1.0) for the "Technical Specification Group Radio Access Network" on "New Radio (NR) Access Technology" and "Physical Layer Aspects" in 3GPP Release 14 have analyzed up to 8 antenna elements for the V2X antenna configuration below 6 GHz.

The technique is applicable for any number of radio chains per radio device. The radio chains may be referred to as, and particularly may be counted as, digital chains, units configured to perform the channel estimation or baseband ports. Furthermore, the technique is applicable in conjunction with any mapping from antennas (e.g., physical antennal elements) to the radio chains.

A radio device does not initially know where the radio signal of its radio communication partner comes from. Conventionally, the radio device needs not only to use the reference signals for blind-decoding of the control information, but also needs to monitor all the possible directions of coming signals. The technique may be beneficially used for self-contained transmissions and/or blind-decoding. By virtue of the widebeam reception brought about by the complementary directional gains, the self-contained transmission and/or the blind-decoding can achieve a predefined latency requirement, e.g., for V2X applications, particularly based on an LTE radio interface or an NR interface.

For blind-decoding, the radio device may use its Radio Network Temporary Identifier (RNTI) to receive and decode candidates of the control information. The RNTI is used to de-mask a cyclic redundancy check (CRC) value of the control information. If no CRC error is detected the radio device determines that the candidate carries its control information.

The self-contained transmission may comprise receiving control information (e.g., a control field) and data (e.g., one or more data packets) in the same TTI. Hence, to be able to receive data, the control information should be correctly decoded in the first place. In V2X communications, decoding of control information usually comprises blind-decoding. Since 3GPP LTE Release 14, blind-decoding has been specified also for the reception of scheduling assignments in a distributed scheduling (also referred to as Mode 4) as an example of control information on sidelinks between radio devices, e.g., according to the standard document 3GPP TS 36.213, Version 14.3.0 ("Technical Specification Group Radio Access Network; Evolved Universal Terrestrial Radio Access (E-UTRA); Physical layer procedures").

If the number of digital chains at a receiver is equal to the number of receiving antennas, the corresponding channel estimation may be implemented as conventional channel estimation. The latter case may be part of the technique or may be excluded from the technique.

Moreover, e.g., for higher carrier frequencies, due to the decreased wavelength and/or physical limitations of antenna panels or arrays, the radio device (e.g., functioning as a receiver) may comprise a hybrid combining architecture. Herein, the hybrid combining architecture encompasses embodiments of the device 100 (e.g., receiving radio devices or receiving base stations), wherein each radio chain (e.g., each digital chain) at the receiver connects to more than one (e.g., physical) antenna. Furthermore, the (e.g., physical) antennas are controlled in the analog domain by phase shifters, e.g., only by phase shifters in the analog domain. Hence, a channel estimation that is effectively in the analog domain of the device 100 is needed, e.g., for optimizing signal reception by jointly controlling phases in the analog domain (briefly: analog phases) and complex weights in the digital domain (briefly: digital weights).

Figure 4:
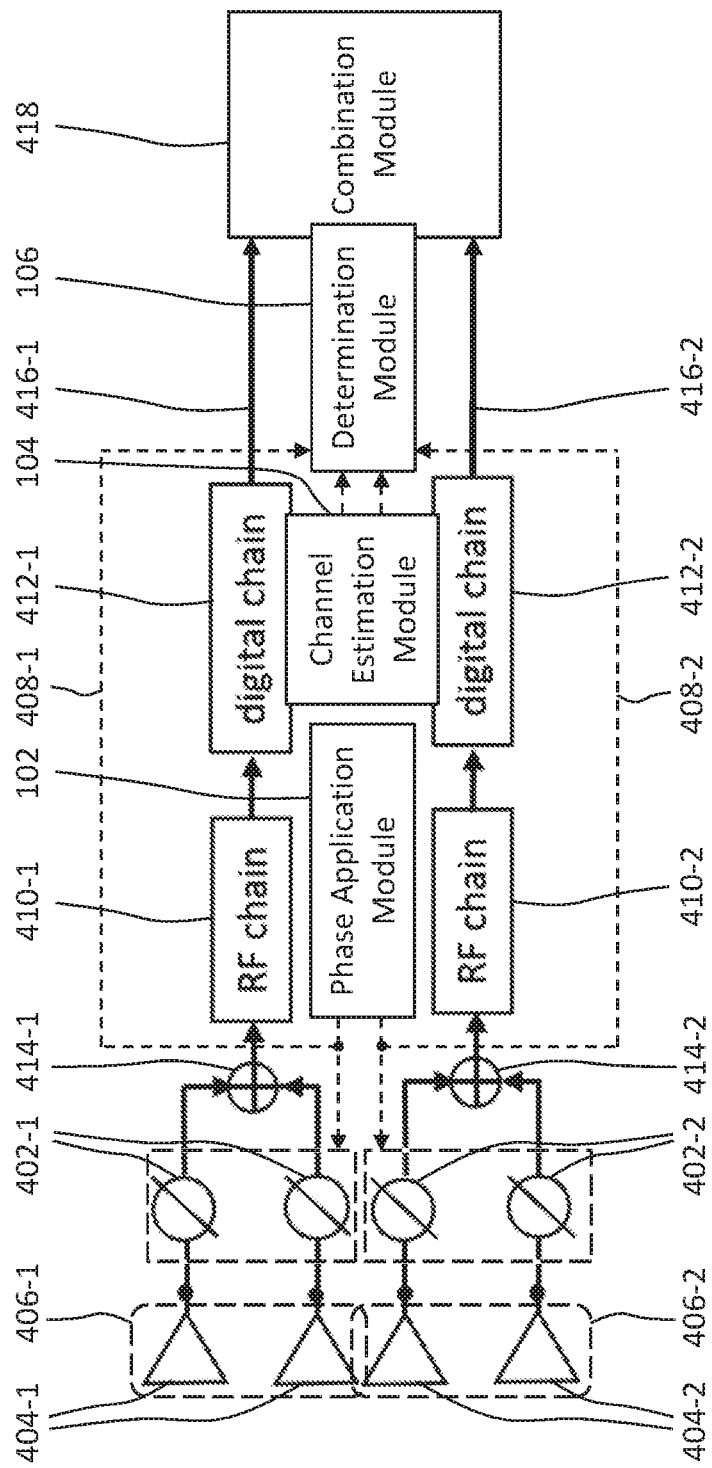
FIG. 4 shows a schematic block diagram of a first embodiment of the device of FIG. 1.

FIG. 4 schematically illustrates a first embodiment of the device 100 comprising or controlling a hybrid combining architecture. Modules implementing those of FIG. 1 are indicated by corresponding reference signs. While the hybrid combining architecture may have advantageous for cost and hardware layout, the device 100 needs to control the (e.g., analog) phase shifters 402 for the (e.g., physical) antennas 404 to optimize signal reception or transmission.

For clarity and without limitation, the embodiment in FIG. 4 comprises 2 arrays 406-1 and 406-2 coupled through the phase shifters 402-1 and 402-2, respectively, to 2 radio chains. The first antennas 404-1 of the first array 406-1 are coupled to respective first phase shifters 402-1. The second antennas 404-2 of the second array 406-2 are coupled to respective second phase shifters 402-2. The analog phases are applied as a first phase vector 408-1 and a second phase vector 408-2 to the first phase shifters 402-1 and the second phase shifters 402-2, respectively.

Each radio chain may comprise a radio frequency (RF) chain 410-1 and 410-2, respectively, and a digital chain 412-1 and 412-2, respectively. For clarity and without limitation, embodiments of the device 100 functioning as a receiver are described. Each of the first phase shifters 402-1 may be coupled by means of a first combiner 414-1 to the first radio chain. Each of the second phase shifters 402-2 may be coupled by means of a second combiner 414-2 to the second radio chain. The phases of the phase vectors 408-1 and 408-2 applied to the phase shifters 402-1 and 402-2, respectively, are also referred to as analog combiner weights. Each of the RF chains 410-1 and 410-2 may comprise a down-converter and an analog to digital converter.

A first baseband signal 416-1 and a second baseband signal 416-2 (e.g., each represented by a sequence of OFDM symbols in the digital domain) are output by the first radio chain and the second radio chain, respectively. The first baseband signal 416-1 and the second baseband signal 416-2 are combined according to the complex weights in a combination module 418, e.g., a decoding module. The decoding module may output bits or softbits based on the combined baseband signals. The phase vectors and/or the complex weights may depend on the determined channel coefficients. The determination module 106 may be implemented in the combination module 418.

Figure 5:
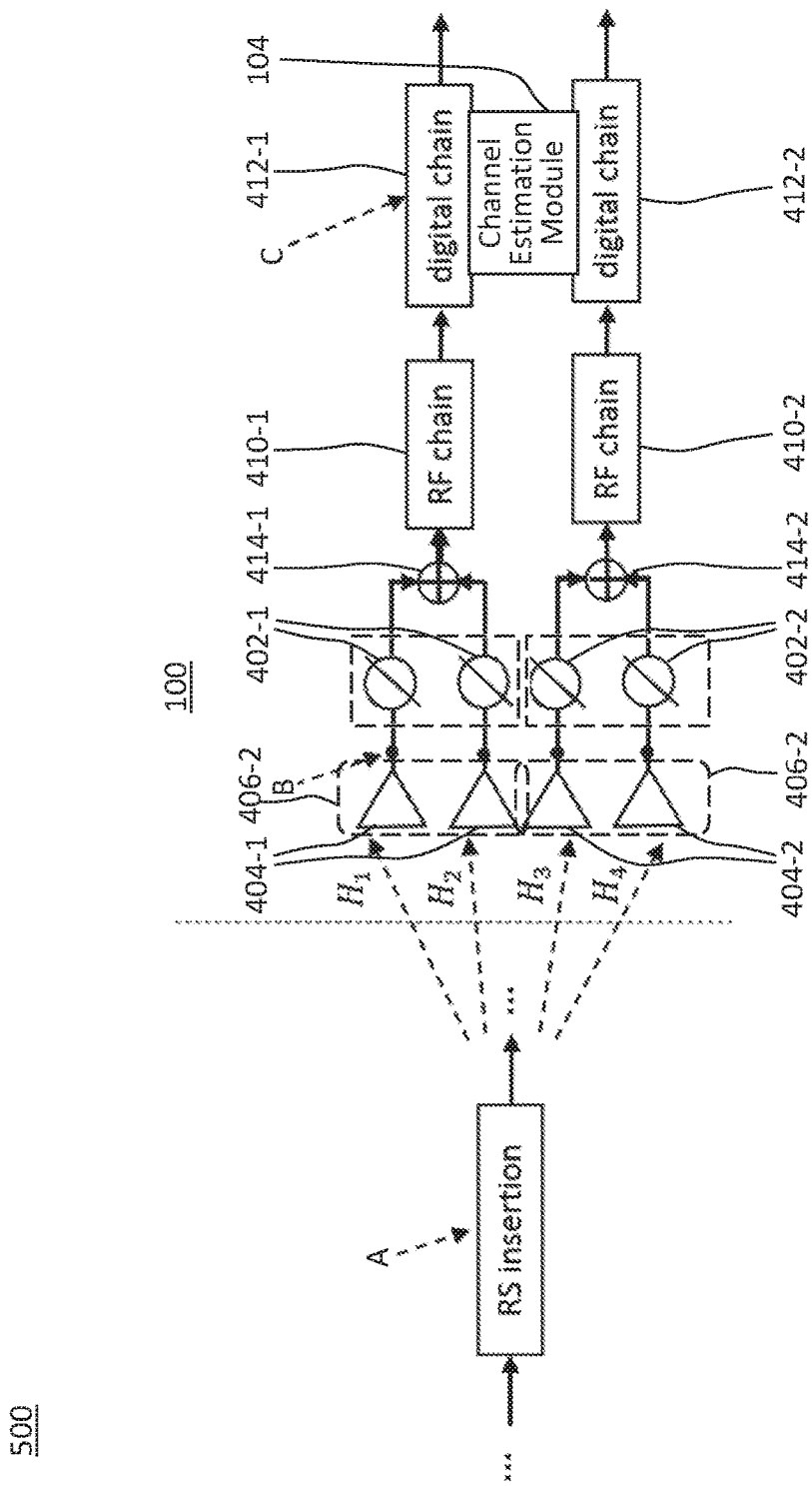
FIG. 5 shows a schematic block diagram of a second embodiment of the device of FIG. 1.

FIG. 5 schematically illustrates a second embodiment of the device 100. Any feature described for the second embodiment is implementable in any other embodiment of the device 100. Particularly, features indicated by like reference signs may be replaced. The second embodiment is particularly useful for defining the channels to be estimated in a communication system 500 comprising radio-communication partners, at least one of which embodies the device 100.

Following the principle of self-contained transmission and blind-decoding, the receiver 100 is usually required to first monitor all the possible directions at the beginning of signal reception, e.g., for receiving control information. Then, to further improve the reliability of later reception, e.g., for receiving data, the phases should be adjusted accordingly. The optimized adjustment of analog combiner weights 408-1 and 408-2 usually requires channel information (symbolized by $H_1$ to $H_4$ in FIG. 5) at the analog domain of the device 100, i.e., the channel from the point where the reference signals are transmitted (i.e., point A in FIG. 5) to the physical antennas 404-1 and 404-2 at the radio device (i.e., point B in FIG. 5). For this purpose, the channel estimation that is effectively in the analog domain is needed, i.e., the determination 206 of channel coefficients for the antennas 404-1 and 404-2.

Problems associated with reference examples of conventionally performing channel estimation (CE) for a receiver with hybrid combining architecture are described.

A first reference example performs CE by antenna switching. At each step, each RF chain only connects to one physical antenna. Also, the RF chain switches its connection among different physical antennas over the steps. In this way, within one step, conventional CE methods operating in the digital domain can be used to estimate the channel at one physical antenna for each RF chain. Since only one physical antenna is active for each RF chain at each CE step, the received signal power during CE steps is not satisfactory for reliable reception and the procedure requires a long training time.

A second reference example exploits the sparsity of radio channels (i.e., the sparsity of phase-stationary paths in a path integral) at millimeter-wave frequencies for the CE. To exploit the sparsity of channels at millimeter-wave frequencies, a compressed sensing technology has drawn lots of interests for efficient channel estimation in angular or time domain, e.g., as described in afore-cited publication "Channel Estimation and Hybrid Precoding for Millimeter Wave Cellular Systems", IEEE J. Sel. Topics Signal Process., vol. 8, no. 5, pp. 831-46, by A. Alkhateeb et al. However, for mobile radio applications, particularly scenarios such as V2X or D2D networks, the channel sparsity may not hold anymore, since firstly the carrier frequency may be lower than millimeter-wave frequency (for example, 5.9 GHz is considered for V2X in 3GPP Release 14), and since secondly antennas at a low height (e.g., relative to the ground surface and as compared to the height of base station antennas) result in a rich scattering environment. Hence, compressed sensing-based CE methods are not appropriate for V2X or D2D communications. Moreover, compressed sensing-based CE methods may be promising candidates usually for massive MIMO deployment, while a vehicle may be deployed with a medium number of antennas (e.g., as it is considered as a UE).

The technique can be implemented to avoid estimating the channel at each of the physical receiving antennas 404-1 and 404-2. The technique can be implemented to estimate the channel only at each of the digital chains 412-1 and 412-2 of the device 100 (e.g., the radio device and/or the receiver). In this way, what is obtained from the CE 204 is the effective channel, which is defined as the channel from the point where the reference signals are inserted at the transmitter (i.e., point A in FIG. 5) to the respective one of the digital chains 414-1 and 414-2 (more specifically, the point in the digital chain functioning as the channel estimation module 104) at the receiver (i.e., point C in FIG. 5). The technique can solve mainly two challenges of this approach. First, during the CE process 204, the analog combiner weights 408-1 and 408-2 are set such that the receiver 100 is able to receive signal from all the possible directions by defining complementary directional gains. Second, the channel coefficients are determined in the step 206 also for the analog domain of the antennas 402, i.e., for the phase shifters 406-1 and 406-2. Not only digital-domain combiner weights are optimized by using the digital-domain CE 204. Hence, the reliability of data decoding can be further improved or optimized by controlling the phase vectors 408-1 and 408-2 (i.e., the analog weights) applied to the phase shifters 402-1 and 402-2 based on the determined channel coefficients resulting from the step 206.

The phase vectors 408-1 and 408-2 (i.e., the analog combiner weights) may be controlled (e.g., set and applied) varying with time, e.g., for a receiver 100 with hybrid combining architecture. The phase vectors 408-1 and 408-2 may be applied such that the channels from the point where the reference signals are inserted at the transmitter (i.e., point A in FIG. 5) to the physical antennas 404-1 and 404-2 at the receiver (i.e., point B in FIG. 5) are estimated. Herein, the hybrid combining architecture may be embodied by each digital chain at the device 100 being connected to more than one physical antenna and each physical antenna 404-1 and 404-2 being controlled in the analog domain by only phase shifters 402-1 and 402-2.

While embodiments are described in the context of V2X and D2D communications, the technique is readily applicable to any other scenarios requiring high reliability and/or to the radio devices (e.g., receivers) with hybrid combining architecture.

The technique may allow (e.g., in a self-contained transmission with blind-decoding) a receiver 100 to first monitor all the possible directions at the beginning of signal reception. This can be achieved by a widebeam reception formed at the receiver 100 using an appropriate set of analog combiner weights 408-1 and 408-2 together with an appropriate combining operation 418 (e.g., a decoding operation) in the digital domain.

Herein, the term "widebeam" (also: "wide beam") may encompass any beam produced by analog weights 408-1 and 408-2 of the antenna arrays 406-1 and 406-2 assuring that the squared modulus of the array factor is (e.g., almost) spatially flat, i.e., the beam pattern of the antenna array (e.g., almost) corresponds to the beam pattern of a single antenna element, e.g., except for a scaled gain difference. Then, to further improve the reliability of later reception, the analog combiner weights should be adjusted accordingly in the controlling step. The optimized adjustment of analog combiner weights usually requires channel information at the Rx analog domain, i.e., for the channel from the point where reference signals are inserted at the transmitter (i.e., point A in FIG. 5) to the physical antennas 404-1 and 404-2 at the receiver (i.e., point B in FIG. 5). For this purpose, channel estimation 204 is needed and can be done within the process of widebeam reception 202 of the reference signals.

Figure 6:
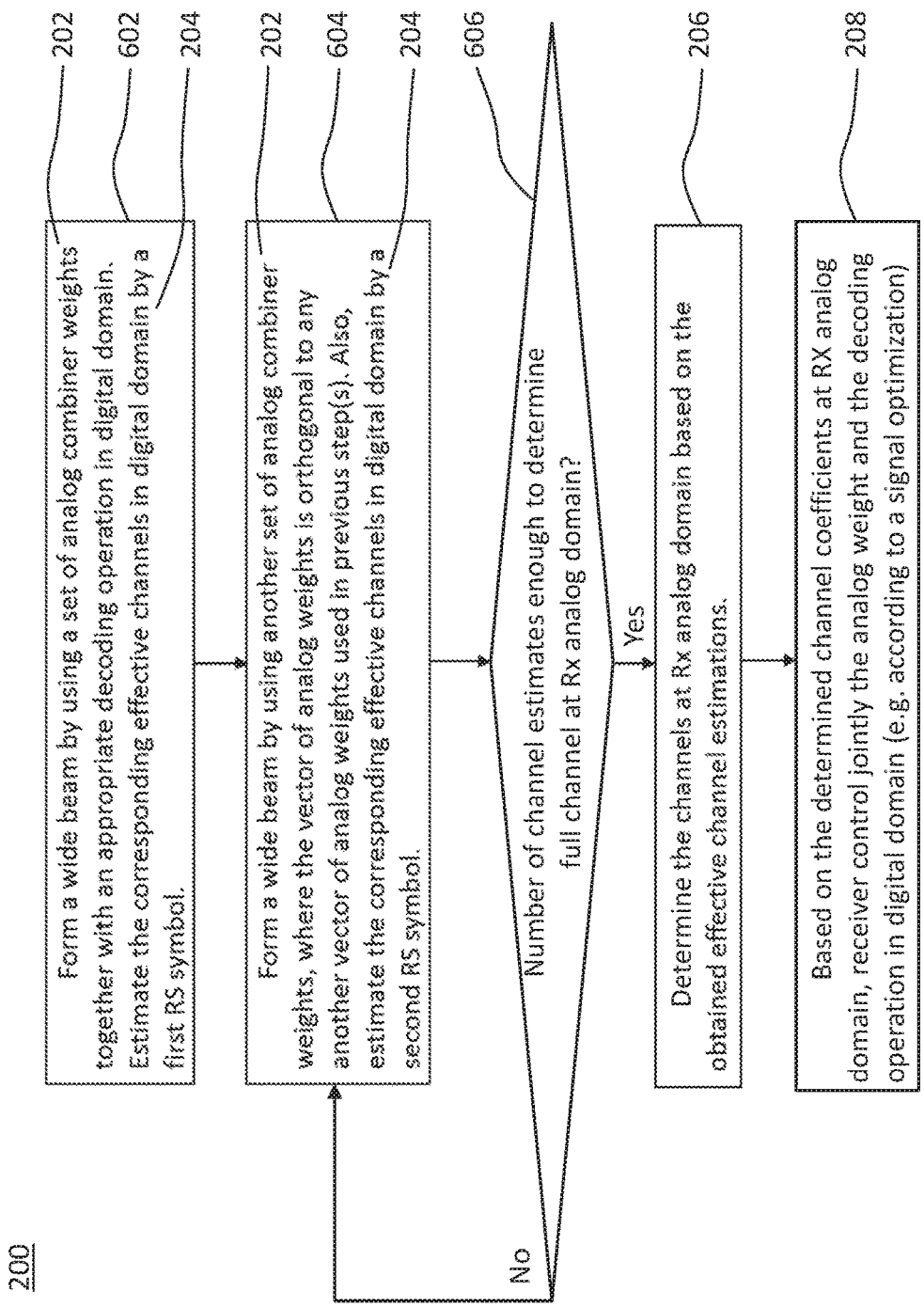
FIG. 6 shows a flowchart for an implementation of the method of FIG. 2.

FIG. 6 shows a flowchart for an implementation of the method 200, which is combinable with any implementation or embodiment disclosed herein. For example, the method 200 may be performed at a receiver, e.g., a receiving radio device. The technique may be implemented as a channel estimation method for a receiver with hybrid combining architecture.

In a first step 602, a widebeam is formed by applying a set of analog combiner weights including the phase vectors 408-1 and 408-2 optionally together with an appropriate decoding operation in a digital domain, as a first instance of the step 202 corresponding to the application of a first pair of phase vectors 408-1 and 408-2. Furthermore, the corresponding effective channels in the digital domain are estimated based on a first symbol of the reference signals, as a first instance of the step 204 corresponding to the application of a first pair of phase vectors 408-1 and 408-2.

In another step 604, a widebeam is formed by applying another set of analog combiner weights including the phase vectors 408-1 and 408-2, as another instance of the step 202 corresponding to the application of another pair of phase vectors 408-1 and 408-2. The first vector 408-1 of the first pair and the first vector 408-1 of the other pair are linearly independent, e.g., orthogonal. The second vector 408-2 of the first pair and the second vector 408-2 of the other pair are linearly independent, e.g., orthogonal. Furthermore, the corresponding effective channels in the digital domain are estimated based on another (e.g., second) symbol of the reference signals.

In the case of further pairs of first and second vectors 408-1 and 408-2, i.e., in the case of repetitions of the other step 604, the first vectors 408-1 of all pairs are linearly independent, e.g., orthogonal, and the second vectors 408-2 of all pairs are linearly independent, e.g., orthogonal. In other words, the first vector 408-1 of the phases is linearly independent, e.g., orthogonal, to all previously applied first phase vectors 408-1. And the second vector 408-2 of the phases is linearly independent, e.g., orthogonal, to all previously applied second phase vectors 408-2. Here, the previous applications of phase vectors (i.e., the phase vector applications since the first step 602) may all relate to one instance of the determination step 206.

According to a branching step 606, the other step 604 is repeated using following (e.g., subsequent) symbols of the reference signals until the number of estimations 204 on the effective channels (i.e., the channel including the applied phases) is enough to estimate the full channels for the antennas, i.e. the channel effective at the analog domain.

In the step 206, the channels for the antennas, i.e., at the analog domain, are determined based on the obtained channel estimations, i.e., based on the channel estimations effective for the digital domain.

In an optional further step 208, the device 100 (e.g., a radio device) functioning as a receiver jointly adjusts the analog weights (including the phase vectors 408-1 and 408-2 applied to the phase shifters 402-1 and 402-2, respectively) and the decoding operation 418 (including the complex weights) in digital domain to improve the reception of further signals, e.g., the data reception.

Further implementation details of any one of the steps 202 and 204 (e.g. implemented as the steps 602, 604 and 606) as well as the steps 206 and 208 are explained.

In the step 602, at the beginning of a signal reception, the receiver monitors all the possible directions by forming a wide reception beam (which is also referred to as forming a widebeam for the reception or performing a widebeam reception). In some embodiments, the analog combiner weights 408-1 and 408-2 used for the phase shifters 402-1 and 402-2 respectively coupled to the two digital chains 412-1 and 412-2 are set according to a pair of complementary sequences. In this way, together with an appropriate decoding operation in the digital domain, the widebeam pattern can be perfectly achieved. Complementary sequences are characterized by the property that an appropriate pair of such sequences is delta-autocorrelated. For instance, in the third embodiment schematically illustrated in FIG. 7A, by setting $c_{11}=1$, $c_{12}=1$, $c_{13}=1$, $c_{14}=-1$, the first phase vector $[c_{11}, c_{12}]$ and the second phase vector $[c_{13}, c_{14}]$ define a pair of complementary sequences, i.e., the pair 408-1 and 408-2 defines complementary directional gains at the first and second arrays 406-1 and 406-2, respectively.

By way of explanation and not limitation, the pairs applied in the step 202 may be Golay Complementary Pairs (GCPs) of sequences (which terminology is used to include both binary and polyphase sequences) for defining a widebeam, e.g., for widebeam reception. That is, the "sequence" is one of the phase vectors, and the values in the sequence are the analog weights or phases.

Denoting the aperiodic autocorrelation function of a sequence $a=(a_0, \ldots, a_{N-1})$, with weights $a_p$ on the unit circle, by $C_a(k)$, the pair of sequences (a, b) is a GCP if and only if $C_a(k)+C_b(k)=2 \cdot N \cdot \delta(k)$, which is equivalent to requiring that the absolute square of the z-transform of the sequences sums up to a constant:

$$|a(z)|^2+|b(z)|^2=2 \cdot N \text{ for any } z \text{ on the unit circle.} \quad \text{(Complementarity)}$$

The latter definition of GCPs is directly applicable to linear arrays 406-1 and 406-2 of antenna elements 404-1 and 404-2, respectively. Denoting the separation between the antenna elements by d and the angle of incidence by $\varphi$, the phase shift is $z=\exp(2\pi j \cdot d \cdot \sin \varphi)$. Hence, the combined directive gain of the two arrays 406-1 and 406-2 of antenna elements with phase vectors a and b, respectively, has the same angular dependency as a single antenna element.

Figure 7A:
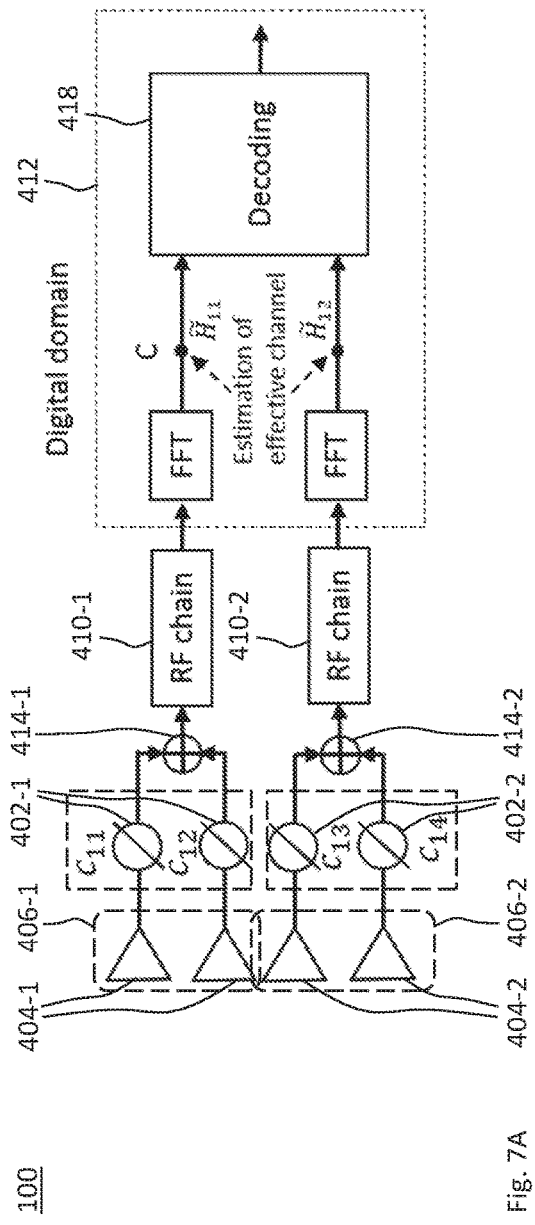
FIG. 7A shows a schematic block diagram of a third embodiment of the device of FIG. 1.

In general, the decoding operation in the digital domain 412 shown in FIG. 7A includes amplitude and phase adjustments of each digital chain 412-1 and 412-2 as well as a summation operation 418 of the two chains. To form a widebeam at the output of the decoding module 418, an example of the appropriate decoding operation is maximal ratio combining (MRC).

Within the widebeam reception, based on the reference signals transmitted from the transmitter, the receiver 100 can estimate the effective channel in the digital domain, e.g., at point C in FIG. 7A. The channels estimated in the first and second radio chains based on the first pair of phase vectors 408-1 and 408-2, respectively, are denoted as $\tilde{H}_{11}$ and $\tilde{H}_{12}$, as schematically illustrated at point C in FIG. 7A. Here, the effective channel means that the effects of the phase vectors 408-1 and 408-2, i.e., the analog weights, i.e., $c_{11}$, $c_{12}$, $c_{13}$ and $c_{14}$, are included in the estimated channels.

Figure 7B:
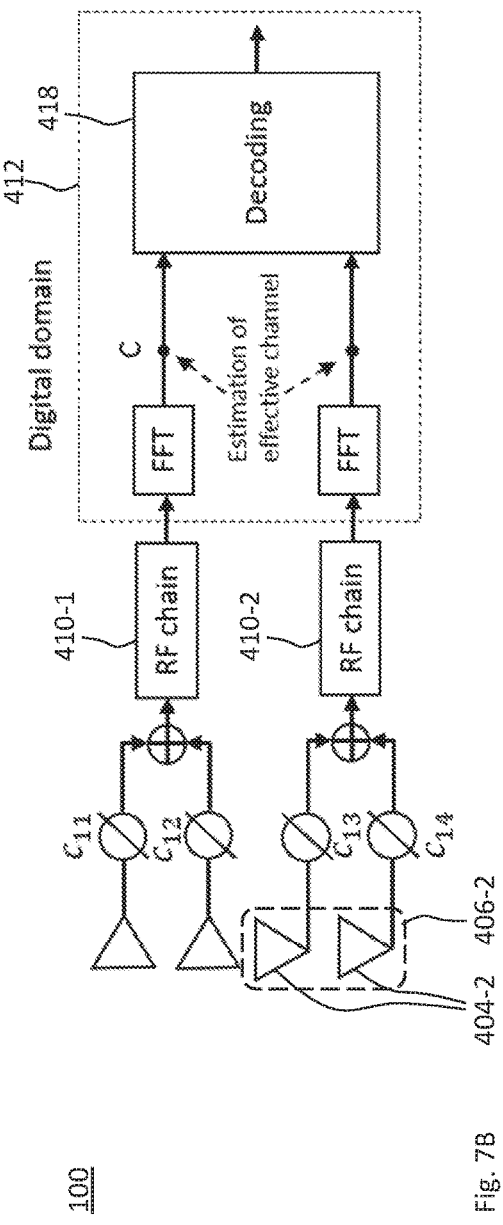
FIG. 7B shows a schematic block diagram of a fourth embodiment of the device of FIG. 1.

In one variant of any embodiment, the device 100 (e.g., the radio device and/or the receiver) comprises co-polarized antennas 404-1 and 404-2, as schematically illustrated for the third embodiment in FIG. 7A. In another variant of any embodiment, cross-polarized (also referred to orthogonally polarized or x-polarized) antennas 404-1 and 404-2 are used at the device 100, as schematically illustrated in FIG. 7B.

Furthermore, in some embodiments, numerically optimized sequence pairs (e.g., epsilon-complementary sequences according to the document WO 2017/190811 A1) can be used as analog combiner weights. Such sequences may have an approximately delta-shaped sum of the aperiodic autocorrelation functions for the first and second phase vectors 408-1 and 408-2. That is, the above exact complementarity requirement may be replaced by an epsilon-complementarity requirement in any embodiment. Such sequences may be applied in the step 202, e.g., for the array sizes for which no complementary sequences are known (e.g., array size equal to 7, 9, 14, 15, 17, . . . ). Herein, the array size may be the number of physical antennas 404-$i$ or the number of antenna ports connected to the i-th radio chain of the radio chains (e.g., the i-th digital chain 412-$i$).

The term "widebeam" may have, at least in part, different meanings in the present disclosure and the afore-mentioned document WO 2017/190811 A1. The document WO 2017/190811 A1 may refer to a widebeam transmission in the sense of widebeam broadcasting. Herein, widebeam reception may or may not encompass that the receiver is equally capable of receiving from multiple directions simultaneously. Rather, the widebeam reception may encompass that for a given single transmitter, after estimating the channel in each of the radio chains, which channel estimates depend on an angle of incidence of this single transmitter, the value of a maximum SNR does not depend on the angle of incidence. In other words, using an MRC process for combining (e.g., decoding) the baseband signals of the two radio chains yields for any given single transmitter the directional dependence for the sensitivity corresponding to a single antenna, although the MRC process depends on the incidence angle relative to the antenna arrays.

In some embodiments, the widebeam reception of the reference signals is combined with receiving control information. Particularly, in self-contained transmission, a control channel is usually transmitted in the first few symbols and then followed by the data transmission. Also, blind decoding is required for control channel reception. In this case, the device 100 firstly forms a widebeam for receiving control information or partial control information, since the device 100 (e.g., the radio device and/or the receiver) does not know where the signal comes from.

In the step 604, the device 100 (e.g., the radio device and/or the receiver) uses another set of analog combiner weights, i.e., a different pair of phase vectors 408-1 and 408-2, optionally together with the appropriate decoding operation in the digital domain 412 to form a widebeam for the reception of the reference signals and optionally control information.

Examples of the analog weights include, e.g., complementary sequences or epsilon-complementary sequences as described in the context of step 602. An example of the appropriate decoding operation includes MRC as described in the context of step 602. In addition to the requirement of forming widebeam, the analog weights used at the group of first phase shifters 402-1 and the group of second phase shifters 402-2 are linearly independent for each group, e.g., orthogonal. That is, for each group, the analog weights used in different pairs according to the step 202 (e.g., in the step 602 and step 604) are linearly independent. Moreover, the estimations 204 (based on the reference signals transmitted from the transmitter) for the effective channels imply the applied analog weights 408-1 and 408-2.

By way of example, the device 100 comprises or controls a hybrid combing architecture with 2 antennas per radio chain, e.g., as shown in each of FIGS. 7A and 7B. In the step 604, the analog weights, i.e., the first and second phase vectors 408-1 and 408-2, are $\{c_{21}, c_{22}\}$ and $\{c_{23}, c_{24}\}$ for the two digital chains 412-1 and 412-2, respectively, wherein $[c_{21}, c_{22}]$ and $[c_{23}, c_{24}]$ is a pair of complementary sequences.

The linear independence may require that the phase vectors applied at each of the two antenna arrays are linearly independent. Denoting the first phase vector 408-1 of the i-th pair as $a_i$ and the second phase vector 408-2 of the i-th pair as $b_i$, the linear independence may be stated as:

$$\det [a_1, a_2] = \det \begin{bmatrix} c_{11} & c_{12} \\ c_{21} & c_{22} \end{bmatrix} \neq 0 \text{ for the first radio chain; and}$$

$$\det [b_1, b_2] = \det \begin{bmatrix} c_{13} & c_{14} \\ c_{23} & c_{24} \end{bmatrix} \neq 0 \text{ for the second radio chain.} \quad \text{(Linear Independence)}$$

The optional orthogonality requirement, which may replace the linear independence, may be stated as:

$$a_1 \cdot a_2^H = [c_{21}, c_{22}] \cdot [c_{11}, c_{12}]^H = 0 \text{ for the first radio chain; and}$$

$$b_1 \cdot b_2^H = [c_{23}, c_{24}] \cdot [c_{13}, c_{14}]^H = 0 \text{ for the second radio chain,} \quad \text{(Orthogonality)}$$

wherein $(.)^H$ denotes conjugate transpose. The first subindex k in the phases $c_{kl}$ is a sequence number of the different pairs (e.g., the number of repetitions of the steps 202 and 204). The second subindex l in the phases $c_{kl}$ is a label of the antennas or phase shifters.

For instance, by setting $c_{11}=1, c_{12}=1, c_{13}=1, c_{14}=-1$ in the first step 602; and $c_{21}=j, c_{22}=-j, c_{23}=1, c_{24}=1$ in the second step 604, both the complementarity requirement and the orthogonality requirement are fulfilled. Furthermore, the effective channels estimated in the digital chains 412-1 and 412-2 are denoted as $\tilde{H}_{21}$ and $\tilde{H}_{22}$ for the second step 604.

In a first variant, which is compatible with any embodiment, the step 604 (e.g., the first repetition of the steps 202 and 204) is combined with receiving control information, e.g., if the reception of the control channel is not finished when receiving the second symbol of the reference signals. In a second variant, which is compatible with the first variant and any embodiment, the step 604 (e.g., the first repetition of the steps 202 and 204) is combined with receiving data, e.g., if the reception of the control channel has already finished before the transmission of the second symbol of the reference signals and when the data is scheduled for symbols following the first symbol of the reference signals.

The step 606 may control a selective repetition of the steps 202 and 204. The steps 202 and 204 may be repeatedly performed by applying different pairs of phase vectors in each case and based on the (e.g., subsequently following) symbols of the reference signals. The application of the different pairs of phase vectors may be synchronized with the transmission of the symbols of the reference signals.

The steps 202 and 204 may be repeated according to the steps 606 until the number of channel estimates 204 in the digital domain 412 is enough to estimate the full channels at the analog domain, e.g., for determining the channel coefficients $H_l$ for the antennas or phase shifters labeled by the index l.

Each repetition of the step 604 may be defined as a sub-step of the step 606. Then, at each sub-step, the device 100 (e.g., the radio device and/or the receiver) uses a set of analog weights 408-1 and 408-2 together with an appropriate decoding operation 418 in the digital domain 412 to form a widebeam. The analog weights 408-1 and 408-2 may be complementary sequences or epsilon-complementary sequences. The decoding operation may be MRC. Also, the analog weights in each sub-step should be linearly independent, preferably orthogonal, to the analog weights used in the steps 602, 604 and the previous sub-steps of step 606 for each radio chain. Accordingly, the phase vector application 202 and the estimation 204 of effective channels may be obtained at each sub-step.

Moreover, the needed number of repetitions of the phase vector applications 202 and corresponding estimations 204 (e.g., within step 606) depends on the number of physical antennas 404-1 or 404-2 connected to each of the digital chains 412-1 and 412-2. In some embodiments, assume that the maximum number of physical antennas connected to one digital chain is M, then the number of repetitions of the step 604 according to the step 606 is M−2. For example, consider the receiver architecture given in FIG. 7A or 7B, wherein each digital chain is connected to M=2 physical antennas, then the step 606 may be skipped (according to M−2=0).

Figure 8:
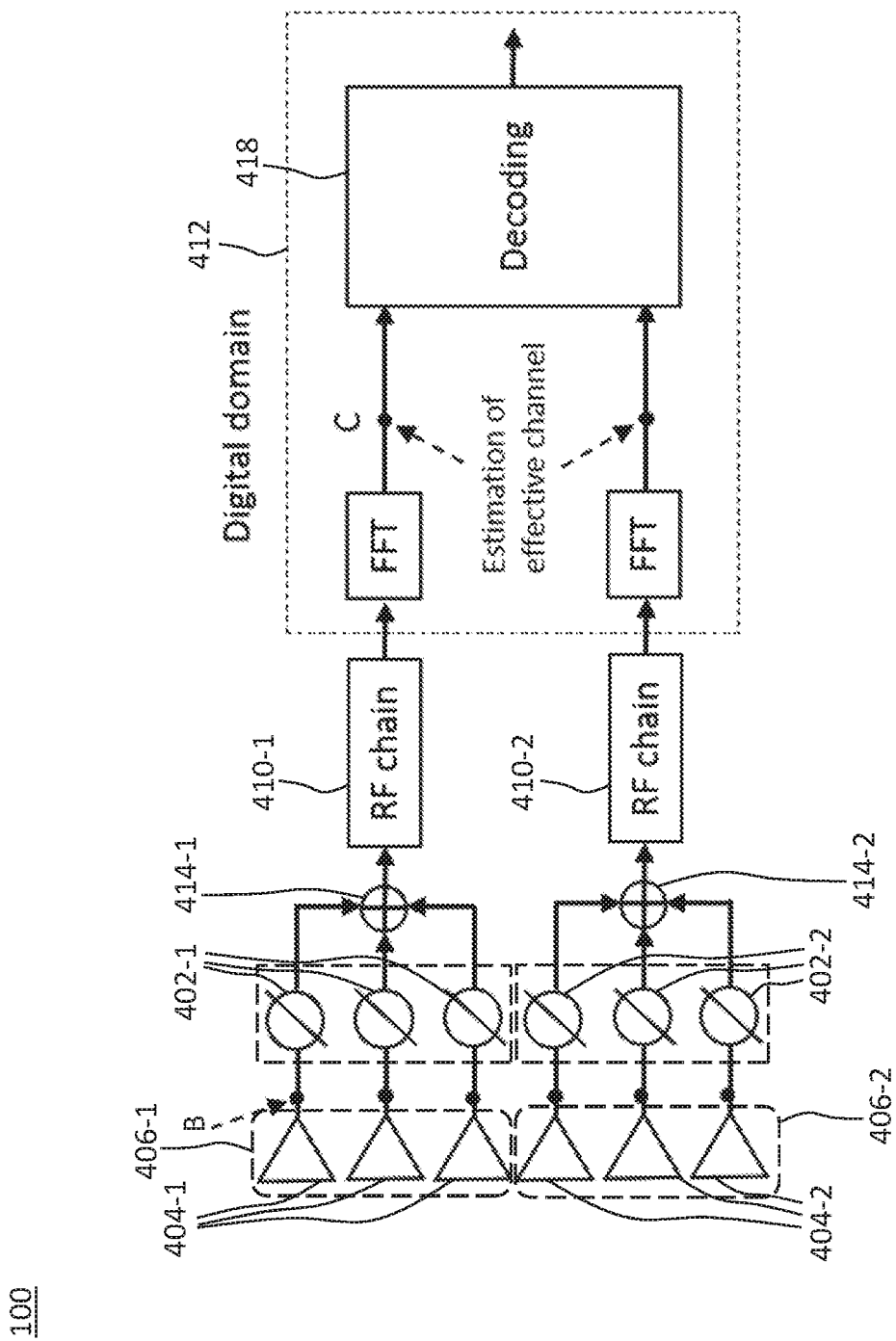
FIG. 8 shows a schematic block diagram of a fifth embodiment of the device of FIG. 1.

FIG. 8 shows a schematic block diagram of a fifth embodiment of the device 100 comprising an example of a receiver architecture with M=3. In the fifth embodiment of the device 100 schematically shown in FIG. 8, the number of antennas per radio chain is M=3, so the step 604 may be repeated once within the step 606. In some other examples, the step 606 may be skipped even if M−2>0 (i.e., even if the number of physical antennas connected to each digital chain is greater than 2), for example in order to determine in the step 206 one or more combination of the channel coefficients for the antennas 404-1 and 404-2.

In the step 206, the device 100 (e.g., the radio device and/or the receiver) will process the estimations of the step 204 on the effective channels in the digital domain 412 to calculate the channel estimates (i.e., to determine channel coefficients) effectively valid at the antennas or phase shifters, i.e., for the analog domain. The determination 206 may be achieved by a linear transformation.

Without limitation, the linear transformation is described for an embodiment of the device 100 comprising 2 antennas 404-1 and 2 antennas 404-2 for the arrays 406-1 and 406-2, respectively, e.g., as shown in FIG. 7A. Particularly, as described above, the first pair of phase vectors 408-1 and 408-2 may be $c_{11}=1$, $c_{12}=1$ and $c_{13}=1$, $c_{14}=-1$, respectively, for the first step 602, i.e., the first instance of the steps 202 and 204. The second pair of phase vectors 408-1 and 408-2 may be $c_{21}=j$, $c_{22}=-j$ and $c_{23}=1$, $c_{24}=1$, respectively, for the step 604, i.e., the second instance of the steps 202 and 204. The channels estimated according to the step 204 in the first and second radio chains are denoted as $\hat{H}_{11}$ and $\hat{H}_{12}$, respectively, at the first step 602; and as $\hat{H}_{21}$ and $\hat{H}_{22}$, respectively, at the step 604. The channel coefficients for the antennas 404-1 and 404-2 (i.e., at the analog domain or for the channels ranging from the point A to the point B shown in FIG. 5) are determined according to $$\begin{bmatrix} \tilde{H}_1 \\ \tilde{H}_2 \\ \tilde{H}_3 \\ \tilde{H}_4 \end{bmatrix} =$$

$$\begin{bmatrix} c_{11} & c_{12} & 0 & 0 \\ c_{21} & c_{22} & 0 & 0 \\ 0 & 0 & c_{13} & c_{14} \\ 0 & 0 & c_{23} & c_{24} \end{bmatrix}^{-1} \begin{bmatrix} \hat{H}_{11} \\ \hat{H}_{21} \\ \hat{H}_{12} \\ \hat{H}_{22} \end{bmatrix} = \begin{bmatrix} \begin{bmatrix} c_{11} & c_{12} \\ c_{21} & c_{22} \end{bmatrix}^{-1} & O \\ O & \begin{bmatrix} c_{13} & c_{14} \\ c_{23} & c_{24} \end{bmatrix}^{-1} \end{bmatrix} \begin{bmatrix} \hat{H}_{11} \\ \hat{H}_{21} \\ \hat{H}_{12} \\ \hat{H}_{22} \end{bmatrix}.$$

The channels estimates for the analog domain may be assumed to be constant or slowly varying over the two steps 602 and 604.

In a variant compatible with any embodiment (e.g., if the step 606 is skipped even if the number of physical antennas 404-$i$ connected to each digital chain 412-$i$ is greater than 2) instead of determining antenna-specific channel coefficients $\tilde{H}_i$ for each of the antennas 404-1 and 404-2 (i.e., complete channel estimate at the analog domain), one or more combinations of these analog domain channel estimates (i.e. combinations of the antenna-specific channel coefficients) are obtained.

In the optional step 208, based on the channel coefficients determined at the analog domain in the step 206, the device 100 (e.g., the radio device and/or the receiver) jointly adjusts the analog weights 408-1 and 408-2 and the decoding operation 418 (e.g., the complex weights) in the digital domain 412 to improve the reception of further signals.

Figure 9:
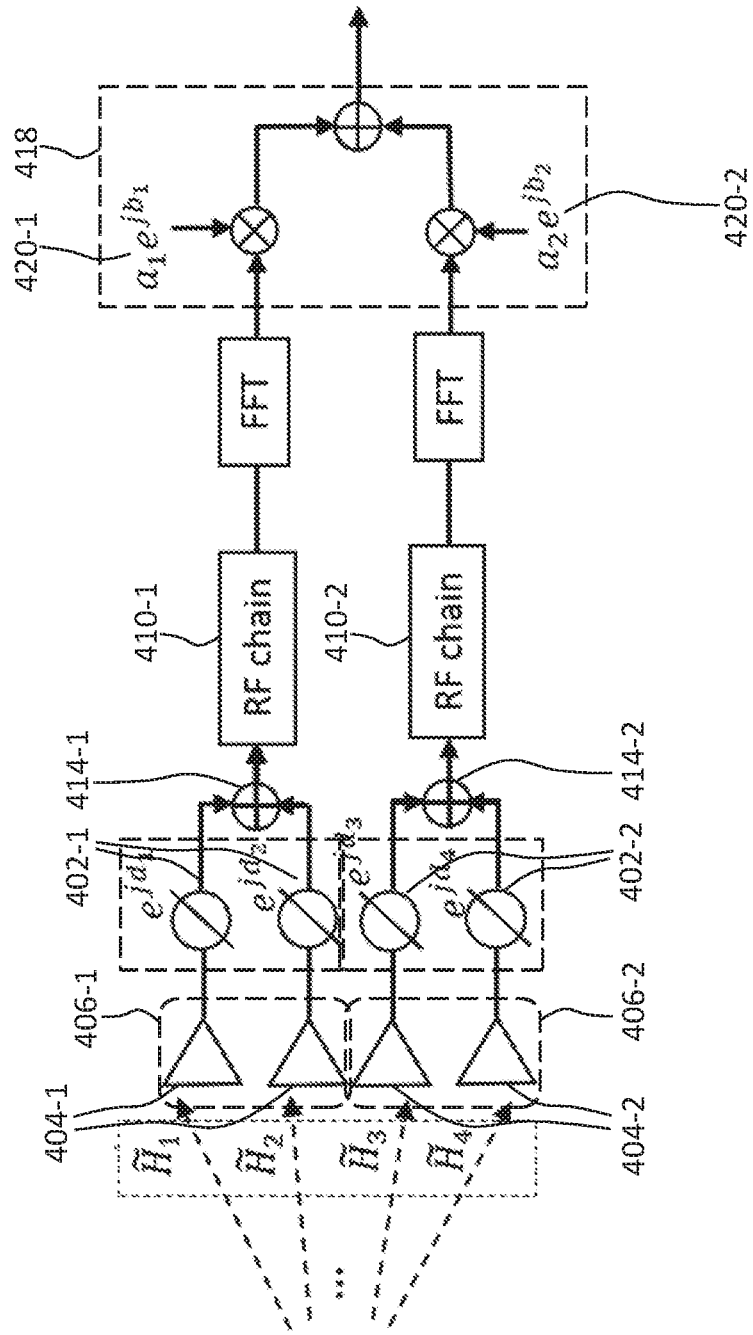
FIG. 9 shows a schematic block diagram of a sixth embodiment of the device of FIG. 1.

FIG. 9 shows a schematic block diagram for a sixth embodiment of the device 100, which features may be combined with any other embodiment and which features may replace corresponding features of other embodiments. The sixth embodiment is useful for explaining the controlling step 208, e.g., the processing at the receiver to exploit the channel estimates of the step 206 for the antennas, i.e., valid for the analog domain.

As an example, consider a generic linear decoding operation in the digital domain as illustrated in FIG. 9, wherein $a_1$, $a_2$, $b_1$, $b_2$, $d_1$, $d_2$, $d_3$, $d_4$ are real numbers. To maximize the signal-to-noise ratio (SNR) of the decoding output, an example implementation of the controlling step 208 satisfies the following relationship between the phases $d_l$ of the analog weights 408-1 and 408-2 and the phases $b_l$ of the digital weights 420-1 and 420-2, wherein l is an index for the antennas among all antennas 404-1 and 404-2 or a phase shifter index among all phase shifters 402-1 and 402-2:

$$d_1+b_1=-\varphi(\tilde{H}_1),$$

$$d_2+b_1=-\varphi(\tilde{H}_2),$$

$$d_3+b_2=-\varphi(\tilde{H}_3), \text{ and}$$

$$d_4+b_2=-\varphi(\tilde{H}_4),$$

wherein $\varphi(.)$ denotes the phase of the a complex number (in the argument).

The gains $a_i$ of the digital weight 420-$i$ (for the first and second radio chains i=1 and i=2) may be determined according to MRC:

$$a_1=(|\tilde{H}_1|+|\tilde{H}_2|)/(2\sigma^2), \text{ and}$$

$$a_2=(|\tilde{H}_3|+|\tilde{H}_4|)/(2\sigma^2),$$

wherein $\sigma^2$ is the white Gaussian noise power at each of the receive antenna 404-1 and 404-2.

In some other examples, e.g., when only combinations of analog domain channel estimates instead of the analog domain channel estimates themselves are available, the adjustment of analog and digital combiner weights is based on the combinations of channel estimates.

In any of the embodiments, e.g., if one or several instances of the steps 202 and/or 204 (e.g., one or several of the steps 602, 604 and/or 606) are performed together with receiving control information, the reception of further signals in the controlling step 208 may include the data reception, e.g., a beamforming reception based on the channel coefficients determined in the step 206. Moreover, in a variant applicable to any embodiment, if one or several instances of the steps 202 and/or 204 are done together with receiving a part of the control information, the reception of further signals in controlling step 208 includes the reception of at least one of the remaining control information and data.

Figure 10:
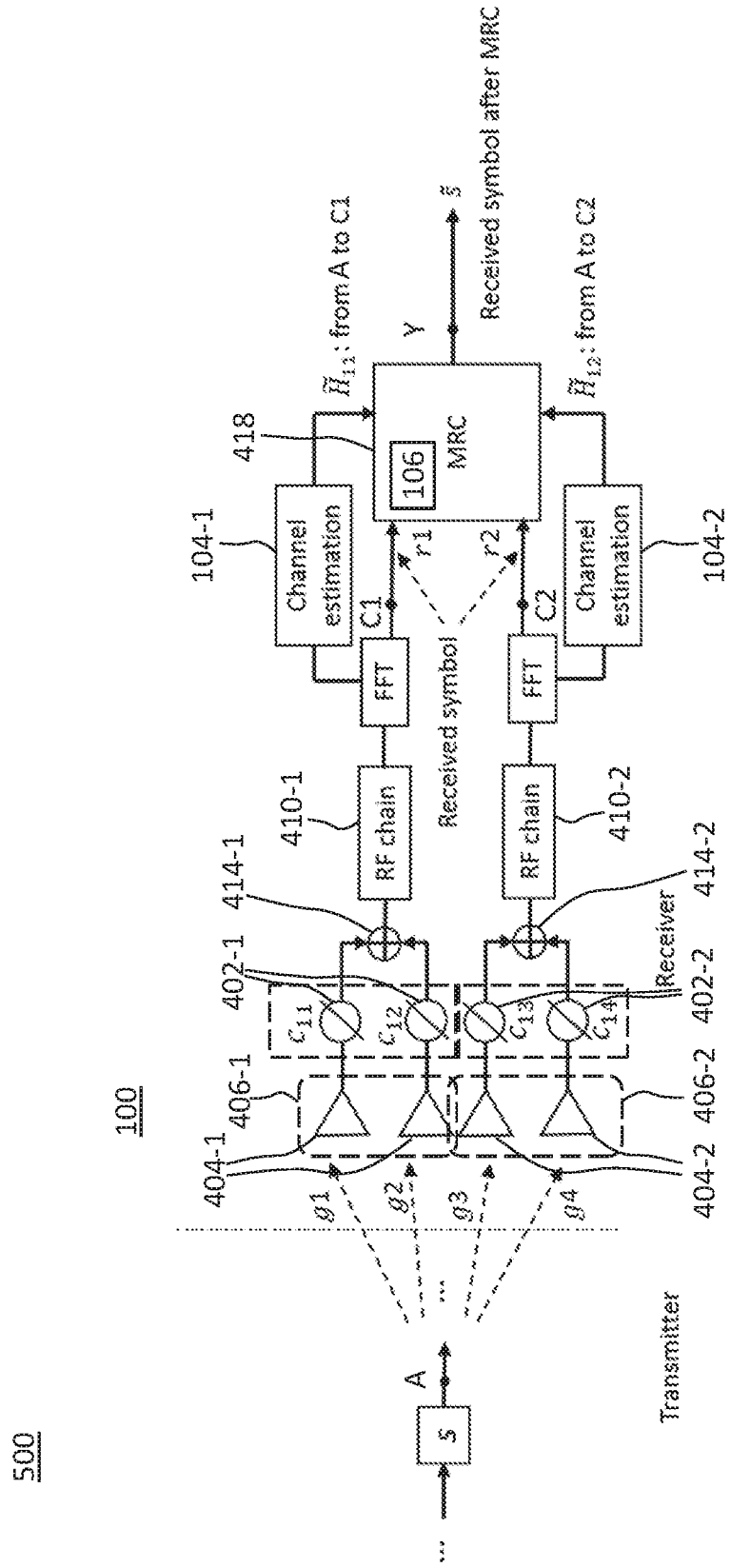
FIG. 10 shows a schematic block diagram of a seventh embodiment of the device of FIG. 1.

FIG. 10 schematically illustrates a seventh embodiment of the device, which is combinable with any other embodiment. The seventh embodiment is useful for explaining exemplary implementation details of the combination module 418 (e.g., the decoding module) for the widebeam reception.

The widebeam reception is formed at the output of the decoding module 418 (e.g., in FIG. 7A), wherein an appropriate example of the combination operation is maximal ratio combining (MRC).

In FIG. 10, a symbol s (on the left-hand side) is transmitted from the transmitter of the communication system 500 at point A. At the receiver embodying the device 100, the received symbols in the frequency domain are denoted as $r_1$ and $r_2$ for the two digital chains, respectively.

The received symbols may be expressed according to $$r_1 = s(g_1 c_{11} + g_2 c_{12}) + n_1 \quad (1)$$
$$= s\, g_1(c_{11} + c_{12} e^{ja}) + n_1 \quad (2)$$
$$= s\, H_{11} + n_1$$

and $$r_2 = s(g_3 c_{13} + g_4 c_{14}) + n_2 \quad (3)$$
$$= s\, g_1(c_{13} e^{j2a} + c_{14} e^{j3a}) + n_2 \quad (4)$$
$$= s\, H_{12} + n_2,$$

respectively, wherein $n_1$ and $n_2$ represent white Gaussian noise at the two receiver digital chains, and $n_1, n_2 \sim N(0, \sigma^2)$. In the above derivations, Equations (1) and (3) follow due to the property of uniform linear antenna array, i.e., $g_2 = g_1 e^{ja}$, $g_3 = g_1 e^{j2a}$, and $g_4 = g_1 e^{j3a}$, where $a = -2\pi\delta \cos\varphi$. Here, $\delta$ is the normalized antenna separation (normalized to the unit of the carrier wavelength), and $\varphi$ is the angle of arrival of the signal reaching the first receive antenna element. Moreover, equations (2) and (4) follow by defining $$H_{11} \stackrel{\Delta}{=} g_1 (c_{11} + c_{12} e^{ja}) \quad (5)$$

and $$H_{12} \stackrel{\Delta}{=} g_1 (c_{13} e^{j2a} + c_{14} e^{j3a}), \quad (6)$$

respectively. Then, the received symbol after MRC decoding is obtained as $$\tilde{s} = k \frac{\tilde{H}_{11}^*}{\sigma^2} r_1 + k \frac{\tilde{H}_{12}^*}{\sigma^2} r_2,$$

wherein k is an arbitrary constant, $\tilde{H}_{11}$ and $\tilde{H}_{12}$ denote the estimated channel coefficients of $H_{11}$ and $H_{12}$, and $(.)^*$ is the notion of conjugate operation. In this way, the signal-to-noise ratio (SNR) of MRC output, i.e., of the symbol $\tilde{s}$, is calculated as $$\gamma = \frac{E\left\{\left|k \frac{\tilde{H}_{11}^*}{\sigma^2} H_{11} + k \frac{\tilde{H}_{12}^*}{\sigma^2} H_{12}\right|^2 |s|^2\right\}}{E\left\{\left|k \frac{\tilde{H}_{11}^*}{\sigma^2} n_1 + k \frac{\tilde{H}_{12}^*}{\sigma^2} n_2\right|^2\right\}} \quad (7)$$

$$= \frac{E\left\{\left|\frac{\tilde{H}_{11}^*}{\sigma^2} H_{11} + \frac{\tilde{H}_{12}^*}{\sigma^2} H_{12}\right|^2 |s|^2\right\}}{E\left\{\left|\frac{\tilde{H}_{11}^*}{\sigma^2} n_1 + \frac{\tilde{H}_{12}^*}{\sigma^2} n_2\right|^2\right\}} \quad (8)$$

$$= \frac{|H_{11}|^2 + |H_{12}|^2}{\sigma^2} \quad (9)$$

$$= \frac{|g_1|^2 (|c_{11} + c_{12} e^{ja}|^2 + |c_{13} e^{j2a} + c_{14} e^{j3a}|^2)}{\sigma^2} \quad (10)$$

wherein $E\{.\}$ represents the expectation of the inner random variable.

In equation (10), with the used complementary sequence pairs, e.g., $c_{11}=1$, $c_{12}=1$, $c_{13}=1$, $c_{14}=-1$, the skilled person can easily verify that $(|c_{11}+c_{12}e^{ja}|^2+|c_{13}e^{j2a}+c_{14}e^{j3a}|^2)$ is a constant that is independent of the angle of arrival $\varphi$. Hence, a widebeam reception is achieved at point Y in FIG. 10.

While above embodiments have been described for the device 100 receiving data, the determined channel coefficients may be applied for a data transmission (e.g., a beamforming transmission) as well. Furthermore, the device 100 may be embodied by a UE1 that estimates the channel from the other radio device, e.g., a UE2. Based on the determined channel coefficients, UE1 may feedback, e.g., an appropriate precoder matrix indicator (PMI), to the UE2 for a later transmission from the UE2 to the UE1.

Moreover, the determined channel coefficients may be used in a scheduling and relay selection. For example, in a TDD system with channel reciprocity, a UE1 may determine the channel coefficients from both a UE2 and a UE3. Based on the determined channel coefficients, the UE1 decides whether it transmits to UE2 or UE3. Note that if UE1 has some specific or targeted data for UE2 and UE3 respectively, it is related to the scheduling case. On the other hand, if UE1 chooses either UE2 or UE3 as one relay station, it is related to the relay selection case.

Figure 11:
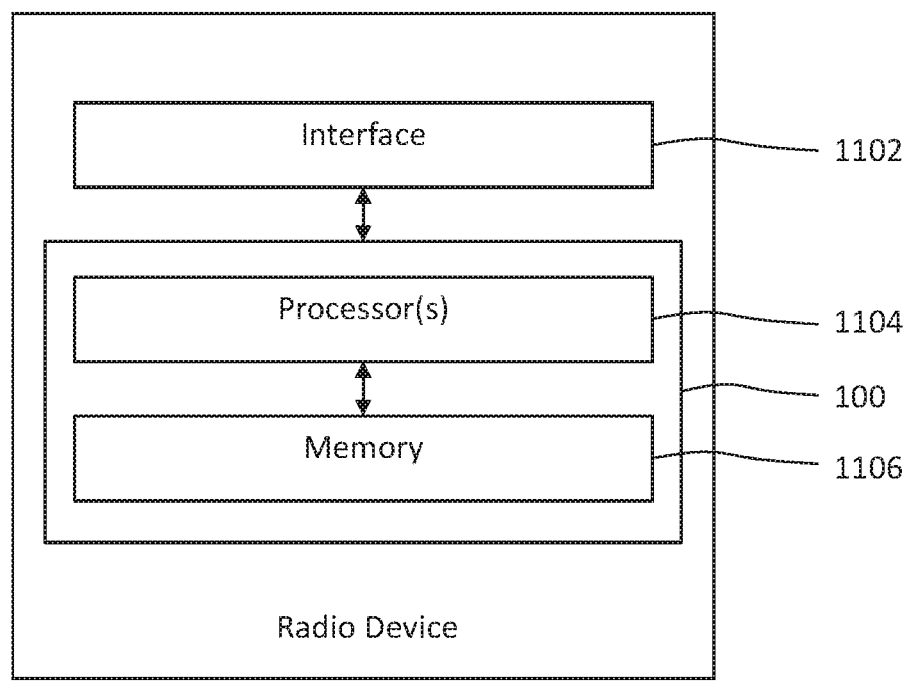
FIG. 11 shows a schematic block diagram of an eighth embodiment of the device of FIG. 1.

FIG. 11 shows a schematic block diagram for an embodiment of the device 100. The device 100 comprises one or more processors 1104 for performing the method 200 and memory 706 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, radio device functionality and/or data receiver functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by a radio device 1100, e.g., functioning as a data receiver or data transmitter. The radio device 1100 comprises a radio interface 1102 coupled to the device 100 for radio communication with one or more radio devices and/or one or more base stations.

As has become apparent from above description, embodiments of the technique enable a channel estimation process for widebeam reception of the coming signal due to the used analog combiner weights, optionally together with an appropriate decoding process in the digital domain. The widebeam reception is particularly valuable when the channel estimation process is combined with control information reception, e.g., for a self-contained transmission. The combined reception can satisfies the principle of blindly decoding a control field.

Same or further embodiments can utilize all available physical antennas and/or enhance the received signal power during the channel estimation process. This is particularly valuable if the channel estimation is combined with control information reception, since the reliability of control reception can be improved.

Same or further embodiments can determine the channel coefficients for the physical antennas of the device or combinations thereof (e.g., aspects of the state of the channel at point B in FIG. 5), based on channel estimates performed in the digital domain by the architecture. Furthermore, the analog combiner weights can be jointly optimized with the digital combiner weights. In this way, the reliability of a later reception (e.g., for receiving data) can be significantly improved.

Figure 12:
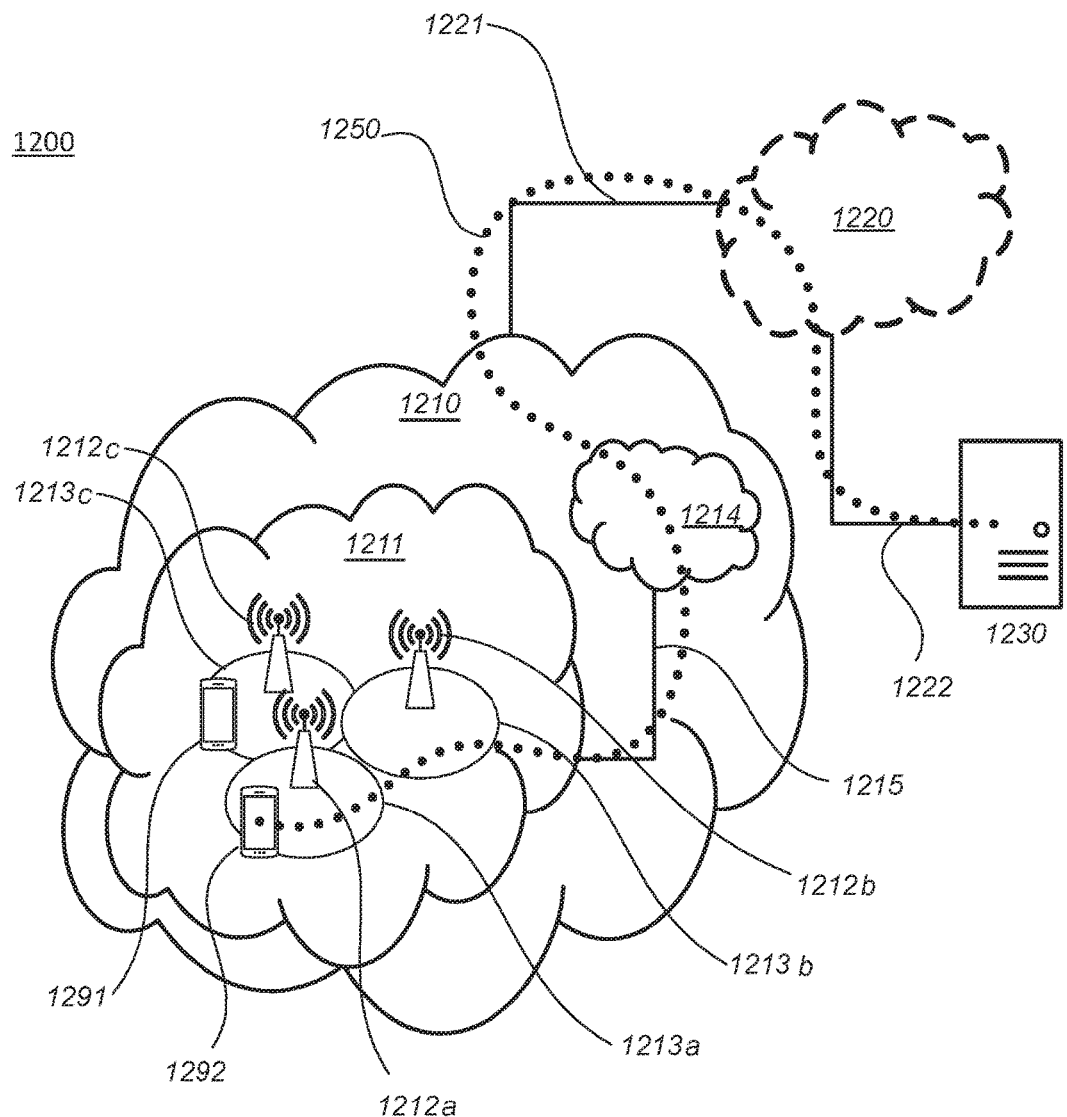
FIG. 12 schematically illustrates a telecommunication network connected via an intermediate network to a host computer.

With reference to FIG. 12, in accordance with an embodiment, a communication system 1200 includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first user equipment (UE) 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system 1200 of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
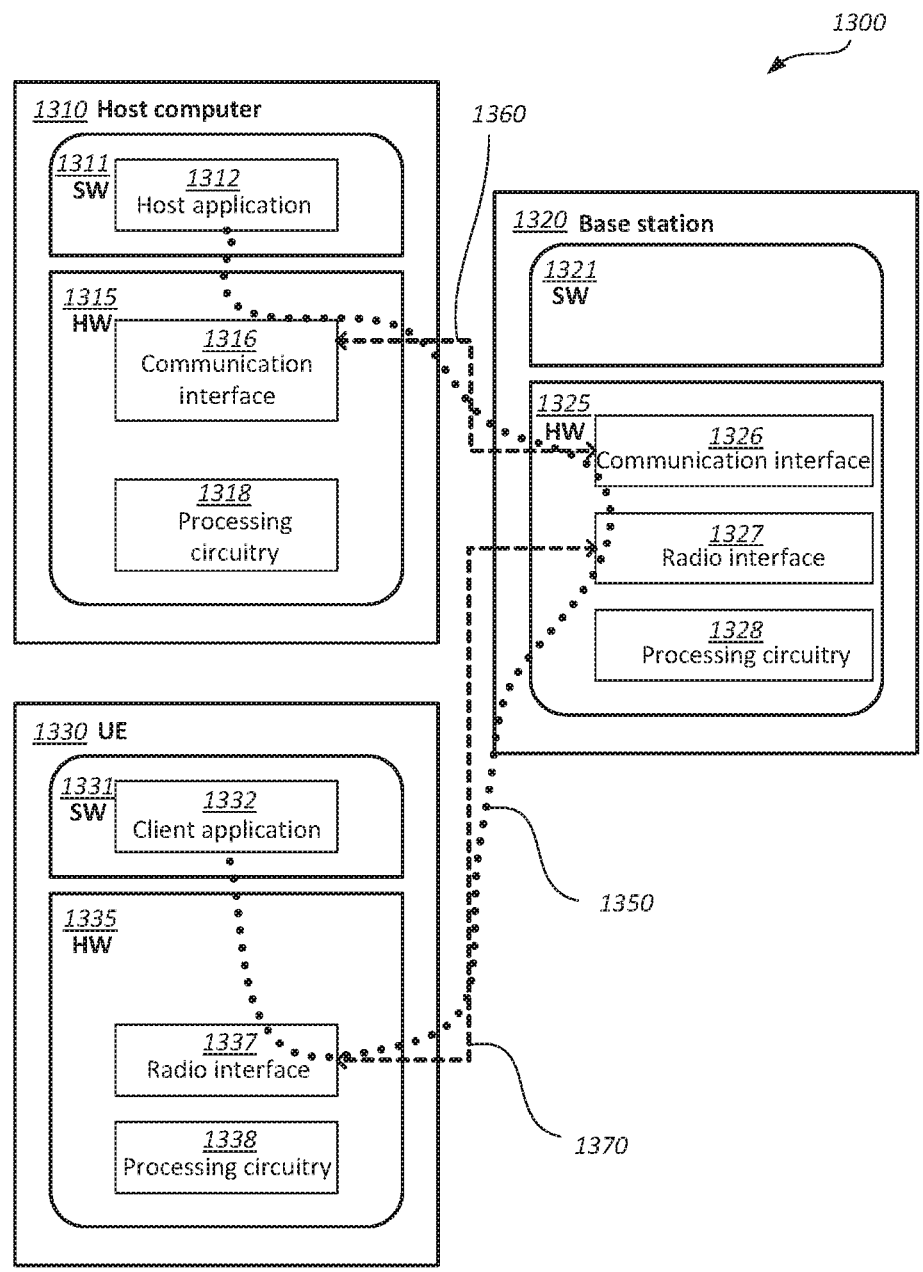
FIG. 13 shows a generalized block diagram of a host computer communicating via a base station with a user equipment over a partially wireless connection.

It is noted that the host computer 1310, base station 1320 and UE 1330 illustrated in FIG. 13 may be identical to the host computer 1230, one of the base stations 1212*a*, 1212*b*, 1212*c* and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or "dummy" messages, using the OTT connection 1350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of determining channel coefficients for a first array of antennas coupled through respective first phase shifters to a first radio chain and a second array of antennas coupled through respective second phase shifters to a second radio chain, the method comprising the steps of:
    applying pairs of first and second phase vectors to the first and second phase shifters, respectively, each of the pairs defining complementary directional gains at the first and second arrays for receiving reference signals;
    performing or initiating a channel estimation in each of the first and second radio chains for each of the pairs based on the received reference signals; and
    determining, based on the channel estimations for each of the pairs, at least one channel coefficient for the antennas in each of the first and second arrays.

2. A device for determining channel coefficients for a first array of antennas coupled through respective first phase shifters to a first radio chain and a second array of antennas coupled through respective second phase shifters to a second radio chain, the device comprising at least one processor and a memory, said memory comprising instructions executable by said at least one processor, whereby the device is operative to:
    apply pairs of first and second phase vectors to the first and second phase shifters, respectively, each of the pairs defining complementary directional gains at the first and second arrays for receiving reference signals;

perform or initiate a channel estimation in each of the first and second radio chains for each of the pairs based on the received reference signals; and determine, based on the channel estimations for each of the pairs, at least one channel coefficient for the antennas in each of the first and second arrays.

3. The device of claim 2, wherein the reference signals are received from a multi-antenna station, the device further operative to:

transmit a control message to the multi-antenna station, the control message being indicative of a precoding matrix depending on the determined channel coefficients.

4. The device of claim 2, wherein the at least one channel coefficient determined for the antennas in each of the first and second arrays comprises at least one combination of channel coefficients of each of the antennas in the corresponding array.

5. The device of claim 2, wherein the channel coefficients are determined for each of the antennas in each of the first and second antenna arrays or for each but one of the antennas in each of the first and second antenna arrays.

6. The device of claim 2, wherein the device is further operative to:

perform or initiate at least one of a beamforming transmission and a beamforming reception based on the determined channel coefficients.

7. The device of claim 6, wherein the phases are controlled for those phase shifters coupled with the antennas for which the channel coefficients are determined.

8. The device of claim 6, wherein a complex weight is applied in each of the first and second radio chains, and wherein, for each of the phase shifters, a combination of the phase at the phase shifter and the complex weight applied in the radio chain coupled to the phase shifter depends on at least one of the channel coefficients determined for the antennas and the channel estimates in the radio chain.

9. The device of claim 6, wherein, for each of the antennas, the sum of a phase of the phase shifter coupled to the antenna and a phase applied in the radio chain coupled to the phase shifter matches a phase of the channel coefficient determined for the antenna.

10. The device of claim 2, wherein the device is further operative to:

control the directional gain by controlling phases of the first and second phase shifters based on the determined channel coefficients.

11. The device of claim 2, wherein baseband signals of the first and second radio chains are combined for decoding.

12. The device of claim 2, wherein the phase shifters are implemented in an analog domain, and wherein the radio chains are implemented in a digital domain.

13. The device of claim 2, wherein the complementary directional gains at the first and second arrays defined by each of the pairs correspond to a widebeam of the first and second arrays.

14. The device of claim 2, wherein each of the pairs of the first and second phase vectors includes a pair of complementary sequences.

15. The device of claim 2, wherein different pairs of first and second phase vectors are applied in different transmission time intervals, TTI.

16. The device of claim 2, wherein, for each of the first and second antenna arrays, the respective phase vectors applied at the respective antenna array are linearly independent.

17. The device of claim 16, wherein, for each of the first and second antenna arrays, determining the channel coefficients of the antennas of the respective antenna array includes multiplying an inverse matrix of the respective phase vectors to results of the channel estimates in the respective radio chain.

18. The device of claim 2, wherein the device is further operable to:

receive or initiate to receive both control information and at least one of the reference signals in a TTI during which at least one of the pairs of first and second phase vectors is applied.

19. A non-transitory computer readable medium comprising instructions executable by a processor to determine channel coefficients for a first array of antennas coupled through respective first phase shifters to a first radio chain and a second array of antennas coupled through respective second phase shifters to a second radio chain, whereby the processor is operable to:

apply pairs of first and second phase vectors to the first and second phase shifters, respectively, each of the pairs defining complementary directional gains at the first and second arrays for receiving reference signals;

perform or initiating a channel estimation in each of the first and second radio chains for each of the pairs based on the received reference signals; and determine, based on the channel estimations for each of the pairs, at least one channel coefficient for the antennas in each of the first and second arrays.

20. A user equipment, UE, configured to communicate with a base station, the UE comprising a radio interface and processing circuitry, wherein in order to determine channel coefficients for a first array of antennas coupled through respective first phase shifters to a first radio chain and a second array of antennas coupled through respective second phase shifters to a second radio chain, the processing circuitry is configured to cause the UE to:

apply pairs of first and second phase vectors to the first and second phase shifters, respectively, each of the pairs defining complementary directional gains at the first and second arrays for receiving reference signals;

perform or initiate a channel estimation in each of the first and second radio chains for each of the pairs based on the received reference signals; and determine, based on the channel estimations for each of the pairs, at least one channel coefficient for the antennas in each of the first and second arrays.

21. A communication system including a host computer comprising:

processing circuitry configured to provide user data; and a communication interface configured to forward user data to a cellular network for transmission to a user equipment, UE, wherein the UE comprises a radio interface and processing circuitry, the processing circuitry of the UE being configured to, in order to determine channel coefficients for a first array of antennas coupled through respective first phase shifters to a first radio chain and a second array of antennas coupled through respective second phase shifters to a second radio chain, cause the UE to:

apply pairs of first and second phase vectors to the first and second phase shifters, respectively, each of the pairs defining complementary directional gains at the first and second arrays for receiving reference signals;

perform or initiate a channel estimation in each of the first and second radio chains for each of the pairs based on the received reference signals; and determine, based on the channel estimations for each of the pairs, at least one channel coefficient for the antennas in each of the first and second arrays.

22. The communication system of claim 21, further including the UE.

23. The communication system of claim 21, wherein the cellular network further includes a base station configured to communicate with the UE.

24. The communication system of claim 21, wherein:

the processing circuitry of the host computer is configured to execute a host application, thereby providing the user data; and the processing circuitry of the UE is configured to execute a client application associated with the host application.

25. A method implemented in a user equipment, UE, for determining channel coefficients for a first array of antennas coupled through respective first phase shifters to a first radio chain and a second array of antennas coupled through respective second phase shifters to a second radio chain, the method comprising the steps of:

applying pairs of first and second phase vectors to the first and second phase shifters, respectively, each of the pairs defining complementary directional gains at the first and second arrays for receiving reference signals;

performing or initiating a channel estimation in each of the first and second radio chains for each of the pairs based on the received reference signals; and determining, based on the channel estimations for each of the pairs, at least one channel coefficient for the antennas in each of the first and second arrays.

* * * * *